United States Patent
Koskan et al.

(10) Patent No.: US 10,867,494 B2
(45) Date of Patent: *Dec. 15, 2020

(54) SYSTEM AND METHOD FOR DYNAMIC VEHICULAR THREAT DETECTION PERIMETER MODIFICATION FOR AN EXITED VEHICULAR OCCUPANT

(71) Applicant: MOTOROLA SOLUTIONS, INC, Chicago, IL (US)

(72) Inventors: Patrick D. Koskan, Jupiter, FL (US); Scott M. Alazraki, Davie, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/668,150

(22) Filed: Oct. 30, 2019

(65) Prior Publication Data
US 2020/0279461 A1 Sep. 3, 2020

Related U.S. Application Data

(63) Continuation of application No. 16/289,823, filed on Mar. 1, 2019, now Pat. No. 10,497,232.

(51) Int. Cl.
*G08B 13/196* (2006.01)
*G08B 13/183* (2006.01)
(Continued)

(52) U.S. Cl.
CPC ......... *G08B 13/19647* (2013.01); *G08B 3/10* (2013.01); *G08B 5/36* (2013.01);
(Continued)

(58) Field of Classification Search
None
See application file for complete search history.

(56) References Cited

U.S. PATENT DOCUMENTS 5,182,641 A * 1/1993 Diner ................... H04N 7/181
348/113
5,680,123 A * 10/1997 Lee .......................... B60Q 1/52
340/937

(Continued)

OTHER PUBLICATIONS

IBM Intelligent Video Analytics, https://www.ibm.com/ie-en/marketplace/video-analytics-for-security, downloaded from internet: Feb. 26, 2019, all pages.
(Continued)

*Primary Examiner* — Fekadeselassie Girma

(57) ABSTRACT

A process for dynamic vehicular threat detection perimeter modification for an exited vehicular occupant includes prior to detecting a vehicular occupant exiting the vehicle, establishing a first sized vehicular geofence surrounding the vehicle as a function of one or more stored vehicular perimeter distances. The first sized vehicular geofence is monitored for a first breach via one of a 360 degree vehicular light imaging and radio wave distancing system. In response to detecting that the vehicular occupant previously inside the vehicle has exited the vehicle, the one or more stored vehicular perimeter distances is modified as a function of a detected location of the exited vehicular occupant to establish a second sized vehicular geofence surrounding the vehicle different than the first sized vehicular geofence. The second sized vehicular geofence is monitored for a second breach via one of the 360 degree vehicular light imaging and radio wave distancing system.

20 Claims, 7 Drawing Sheets

(51) Int. Cl.
    *G08B 3/10*      (2006.01)
    *G08B 5/36*      (2006.01)
    *G08B 29/18*     (2006.01)
    *H04W 4/021*     (2018.01)
    *H04W 4/40*      (2018.01)
    *H04W 4/10*      (2009.01)
    *H04W 4/029*     (2018.01)

(52) U.S. Cl.
    CPC ......... *G08B 13/183* (2013.01); *G08B 29/185* (2013.01); *H04W 4/022* (2013.01); *H04W 4/029* (2018.02); *H04W 4/10* (2013.01); *H04W 4/40* (2018.02)

(56) References Cited

U.S. PATENT DOCUMENTS

| | | | |
|---|---|---|---|
| 6,535,242 B1* | 3/2003 | Strumolo | B60R 11/04 348/148 |
| 7,171,027 B2* | 1/2007 | Satoh | G06T 1/00 340/937 |
| 7,425,889 B2* | 9/2008 | Widmann | B60R 1/003 340/425.5 |
| 7,728,721 B2* | 6/2010 | Schofield | B60Q 1/2665 340/438 |
| 8,083,386 B2* | 12/2011 | Lynam | B60R 1/088 362/494 |
| 8,130,120 B2* | 3/2012 | Kawabata | B60R 1/00 340/908 |
| 8,462,204 B2* | 6/2013 | Schofield | H04N 7/181 348/115 |
| 8,536,999 B2 | 9/2013 | Holcman et al. | |
| 8,564,661 B2 | 10/2013 | Lipton et al. | |
| 8,624,727 B2 | 1/2014 | Saigh et al. | |
| 8,655,551 B2* | 2/2014 | Danz | B62D 15/0275 701/44 |
| 8,823,796 B2* | 9/2014 | Shen | B60R 1/00 348/148 |
| 9,437,111 B2 | 9/2016 | Ignaczak et al. | |
| 9,448,300 B2* | 9/2016 | Jansen | G01S 7/003 |
| 9,489,545 B2 | 11/2016 | Hirsch et al. | |
| 9,744,907 B2* | 8/2017 | Boehm | B60R 1/08 |
| 9,788,156 B1 | 10/2017 | Anderson et al. | |
| 10,131,279 B2* | 11/2018 | Minikey, Jr. | H05K 9/0045 |
| 10,182,312 B1* | 1/2019 | Korhonen | G06Q 30/0261 |
| 10,306,430 B1* | 5/2019 | Abari | G05D 1/0055 |
| 10,421,437 B1 | 9/2019 | Koskan e al. | |
| 10,497,232 B1 | 12/2019 | Koskan et al. | |
| 2003/0080877 A1* | 5/2003 | Takagi | B60R 1/00 340/932.2 |
| 2003/0090570 A1* | 5/2003 | Takagi | B60R 1/00 348/148 |
| 2005/0240342 A1* | 10/2005 | Ishihara | G08G 1/167 701/1 |
| 2006/0119472 A1* | 6/2006 | Tsuboi | B60Q 9/006 340/435 |
| 2006/0215020 A1* | 9/2006 | Mori | B62D 15/0295 348/119 |
| 2007/0299584 A1* | 12/2007 | Okamoto | B62D 15/02 701/41 |
| 2008/0055411 A1* | 3/2008 | Lee | B60R 1/00 348/148 |
| 2009/0085913 A1* | 4/2009 | Sakamoto | G06K 9/00798 345/420 |
| 2009/0143967 A1* | 6/2009 | Lee | B60R 1/00 701/119 |
| 2010/0066518 A1* | 3/2010 | Ohshima | B60R 1/00 340/435 |
| 2010/0208073 A1* | 8/2010 | Hattori | B60R 1/00 348/148 |
| 2010/0220189 A1* | 9/2010 | Yanagi | B60R 1/00 348/148 |
| 2010/0245577 A1* | 9/2010 | Yamamoto | B60R 1/00 348/148 |
| 2011/0106380 A1* | 5/2011 | Wang | B62D 15/028 701/36 |
| 2011/0181406 A1* | 7/2011 | Lin | B60R 1/00 340/425.5 |
| 2011/0298579 A1 | 12/2011 | Hardegger et al. | |
| 2012/0158256 A1* | 6/2012 | Kuboyama | B62D 15/0275 701/51 |
| 2012/0236112 A1 | 9/2012 | Cilia | |
| 2013/0242701 A1* | 9/2013 | Karl | G01S 7/003 367/93 |
| 2015/0084756 A1* | 3/2015 | Mori | B60Q 3/14 340/435 |
| 2015/0310729 A1 | 10/2015 | Lampert et al. | |
| 2016/0033640 A1* | 2/2016 | De Mersseman | G01S 7/2813 342/70 |
| 2016/0307420 A1 | 10/2016 | Delean | |
| 2017/0101110 A1 | 4/2017 | Yoo | |
| 2018/0184244 A1* | 6/2018 | Bestor | G06K 9/00771 |

OTHER PUBLICATIONS

Sightlogix, Perimeter Security from SightLogix, https://www.sightlogix.com/perimeter-security/, downloaded from internet: Feb. 26, 2019, all pages.

Shyam, Advanced Video Analytics, http://www.shyamnetworks.com/wp-content/uploads/2012/01/Shyam-Advance-Video-Anlytics_PA3.pdf, downloaded from the internet: Feb. 26, 2019, all pages.

The International Search Report and the Written Opinion corresponding patent application No. PCT/US2020/017128 filed: Feb. 7, 2020, dated Jul. 20, 2020, all pages.

* cited by examiner

SYSTEM AND METHOD FOR DYNAMIC VEHICULAR THREAT DETECTION PERIMETER MODIFICATION FOR AN EXITED VEHICULAR OCCUPANT

The present invention is a continuation application of U.S. patent application Ser. No. 16/289,823 filed in the United States Patent Office on Mar. 1, 2019, the entire contents of which is incorporated herein by reference.

BACKGROUND OF THE INVENTION

First responders and other types of users, such as private security personnel, may be under a constant threat of physical harm and safety based on their position and/or function. This is especially true when the first responder is within or nearby his or her vehicle and has his or her attention focused on other activities, such as writing incident reports, researching case or offender information via personal or vehicular electronic devices, or canvassing an incident scene for clues or evidence. As a result, the first responder may not be alert and may be more likely to inadvertently subject himself or herself to an unsafe situation.

Technologies exist to create virtual perimeters and to detect breaches of those perimeters, such as via video imaging and applied analytic techniques to warn of a breach of such a perimeter. For example, a perimeter may be established surrounding a building and a breach of the perimeter detected by a motion sensing analytic operating on an imaging camera directed at the building perimeter.

However, current technical solutions for perimeter breach detections based on fixed and/or pre-configured perimeters are not well adapted to the dynamic nature of a vehicle and the varying environments the vehicle and/or its occupants may be subjected to. Furthermore, in order to be effective, an established perimeter threat detection system must avoid false positive notifications and notify the first responder of a breach in a determined right way at a determined right time to avoid the feature from simply being turned off. However, current technical solutions are not dynamic enough to avoid such false positives and tend to over-notify or under-notify in various in-opportune contexts, and are not adaptable to varying electronically detectable events that may occur in and around the vehicle.

Thus, there exists a need for an improved technical method, device, and system for dynamic vehicular threat detection perimeter modification for an exited vehicular occupant.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
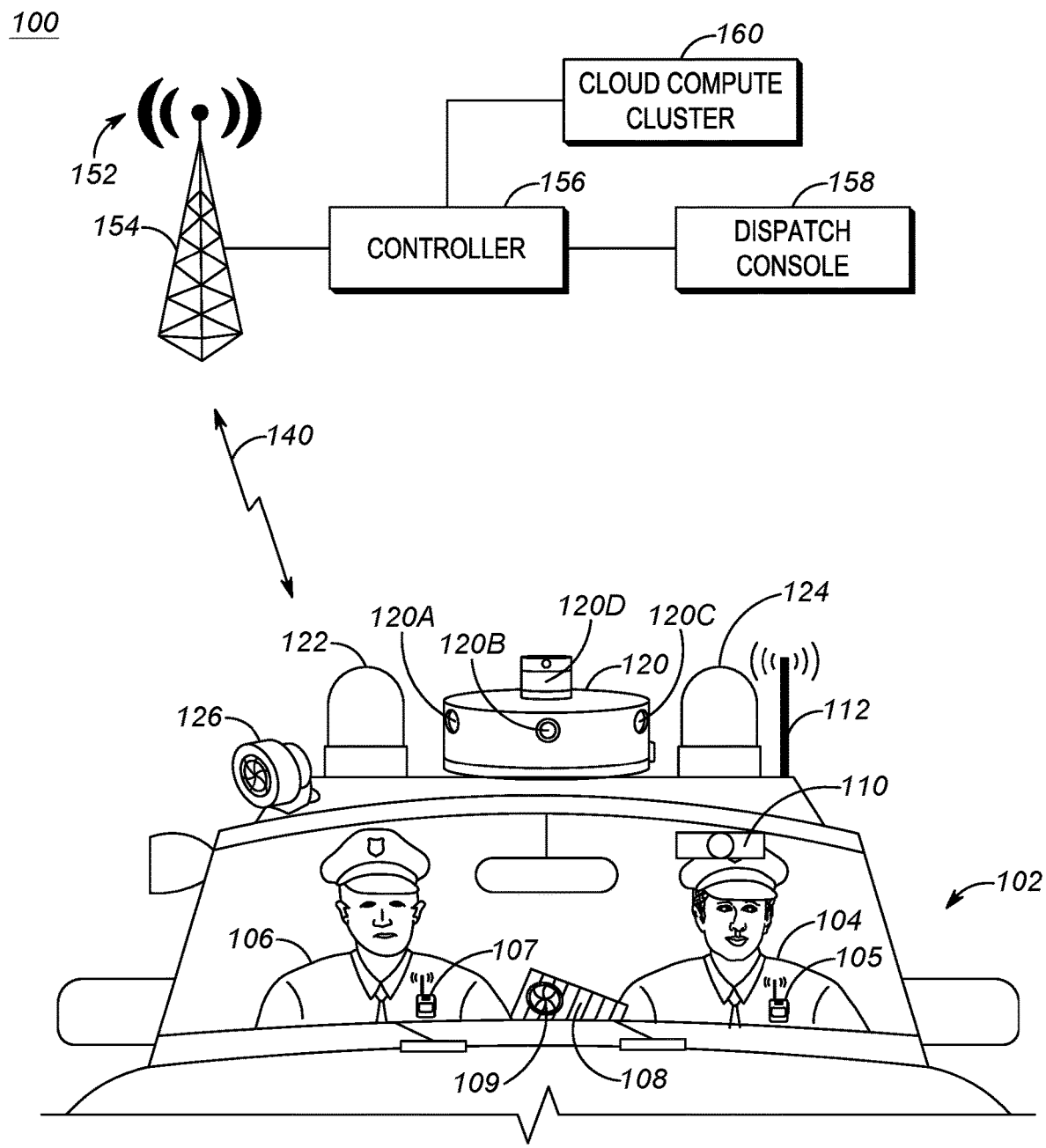
FIG. 1 is a system diagram illustrating an example operating environment for dynamic vehicular threat detection perimeter modification for an exited vehicular occupant, in accordance with an embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed is an improved technical method, device, and system for dynamic vehicular threat detection perimeter modification for an exited vehicular occupant. The disclosed technical solution dynamically varies an initial established electronic vehicular geofence surrounding the vehicle in response to, and as a function of a location of, a vehicular occupant detected to have exited the vehicle. As a result, an improved electronic vehicular perimeter threat detection function can be provided not only for the vehicle itself (or occupants remaining in the vehicle), but additionally for an exited occupant as the exited occupant moves about an area surrounding the vehicle. In some embodiments, and when the exited occupant (or occupants) is detected to have moved a threshold distance away from the vehicle, a separate secondary electronic geofence can be responsively and automatically created surrounding the (threshold distance away) vehicular occupant and avoid causing the geofence surrounding the vehicle and the exited occupant from becoming large enough that it envelops so much geographic space that electronic notifications of breaches of the geofence become either un-useful or so numerous that they are ignored. Other technical solutions and corresponding advantages addressing other technical problems are possible as well, including those set forth herein and throughout the remainder of this description.

In one particular embodiment, an electronic processing system for dynamic vehicular threat detection perimeter modification for an exited vehicular occupant includes: a memory; a transceiver; one of a 360 degree vehicular light imaging and a radio wave distancing system physically coupled to a vehicle; and one or more processors configured to: prior to detecting a vehicular occupant exiting the vehicle, establish a first sized vehicular geofence surrounding the vehicle as a function of one or more stored vehicular perimeter distances; monitor, via one of the 360 degree vehicular light imaging and radio wave distancing system, for a first breach of the first sized vehicular geofence; detect, via the one of the 360 degree vehicular light imaging and radio wave distancing system or via another sensor physically coupled to an interior or exterior of the vehicle or to a vehicular occupant, that the vehicular occupant previously inside the vehicle has exited the vehicle; modify, as a function of a detected location of the exited vehicular occupant, at least one of the one or more stored vehicular perimeter distances to establish a second sized vehicular geofence surrounding the vehicle as a function of the modified one or more stored vehicular perimeter distances, the second sized vehicular geofence being different than the first sized vehicular geofence; and monitor, via the one of the 360 degree vehicular light imaging and radio wave distancing system, for a second breach of the second sized vehicular geofence.

In a further particular embodiment, a process for dynamic vehicular threat detection perimeter modification for an exited vehicular occupant includes: prior to detecting a vehicular occupant exiting the vehicle, establishing, by an electronic computing device, a first sized vehicular geofence surrounding the vehicle as a function of one or more stored vehicular perimeter distances; monitoring, by the electronic computing device via one of a 360 degree vehicular light imaging and radio wave distancing system, for a first breach of the first sized vehicular geofence; detecting, by the electronic computing device via the one of the 360 degree vehicular light imaging and radio wave distancing system or via another sensor physically coupled to an interior or exterior of the vehicle or to a vehicular occupant, that the vehicular occupant previously inside the vehicle has exited the vehicle; modifying, by the electronic computing device as a function of a detected location of the exited vehicular occupant, at least one of the one or more stored vehicular perimeter distances to establish a second sized vehicular geofence surrounding the vehicle as a function of the modified one or more stored vehicular perimeter distances, the second sized vehicular geofence being different than the first sized vehicular geofence; and monitoring, by the electronic computing device via the one of the 360 degree vehicular light imaging and radio wave distancing system, for a second breach of the second sized vehicular geofence.

Each of the above-mentioned embodiments will be discussed in more detail below, starting with an example communication system and a device architecture of an electronic computing device and system in which the embodiments may be practiced, followed by an illustration of processing blocks for achieving an improved method, device, and system for dynamic perimeter threat detection for an exited vehicular occupant. Further advantages and features consistent with this disclosure will be set forth in the following detailed description, with reference to the figures.

1. COMMUNICATION SYSTEM AND DEVICE ARCHITECTURE a. Communication System Architecture

Referring now to the drawings, and in particular FIG. 1, an example communication system diagram illustrates a system 100 including a first movable vehicle 102 and an example wireless infrastructure radio access network (RAN) 152. The first movable vehicle 102 is illustrated with two vehicle occupants including a first officer 104 driver having an associated personal radio communication device 105 and a second officer 106 passenger having an associated personal radio communication device 107, and is equipped with a vehicular computing device 108, an internal speaker 109, a driver's head and/or eye-tracking device 110, an antenna 112 communicatively coupled to a transceiver at the vehicular computing device for communicating with other computing devices in an ad-hoc manner or in an infrastructure manner via RAN 152, an integrated vehicular appliance 120 for capturing a 360° field-of-view in an area surrounding the movable vehicle 102 and for detecting approaching threats, external lights 122 and 124, and an external speaker 126.

The movable vehicle 102 may be a human-operable vehicle, or may be a partially or fully self-driving vehicle operable under control of vehicular computing device 108, perhaps in cooperation with integrated vehicular appliance 120 (which may include one or more of visible-light camera(s), infrared light camera(s), time-of-flight depth camera(s), radio wave emission and detection (such as radio direction and distancing (RADAR) or sound navigation and ranging (SONAR)) device(s), and/or light detection and ranging (LiDAR) device(s) for self-driving purposes and/or for the other purposes as set forth herein). The vehicle 102 may include a location (and/or orientation) determination device integrated with or separately disposed in the vehicular computing device 108 and/or antenna 112 or associated transceiver for determining (and storing and/or transmitting) a location (and/or orientation) of the vehicle 102. The vehicular computing device 108 may further contain a mapping and routing application that may provide an input interface (touch, keyboard, voice, wireless transceiver, etc.) for a user such as first officer 104 to enter an intended destination or assigned incident location for the movable vehicle 102, and after which may provide directions to the first officer 104 to move the vehicle to the intended destination or assigned incident location or may control the movable vehicle 102, perhaps in cooperation with the integrated vehicular appliance 120, to actually move the vehicle 102 to the intended destination or assigned incident location.

The first officer 104 is illustrated in FIG. 1 as an officer (e.g. such as a police officer), but in other embodiments, may be any type of vehicle occupant, including one that may drive the vehicle to a particular intended destination or assigned incident location, or may enter an intended destination or assigned incident location into the vehicular computing device 108 prior to physically driving to the intended destination or assigned incident location, and who may be interested in dynamically establishing threat detection perimeter distance(s) at such an intended destination or assigned incident location and being notified of breaches of the dynamically established threat detection perimeter distance(s) in accordance with the disclosure set forth herein.

For example, first officer 104 may, in other embodiments, work for other governmental and non-governmental agencies such as park districts, real estate offices, or other types of security details. Similar considerations may be applied to the second officer 106. Each of the first officer 104 and second officer 106 is also equipped with an associated radio communication device 105, 107, which may be carried as a hip radio, as an integrated radio-speaker-microphone (RSM) device, or some other device capable of communicating via short-range and/or long-range wireless communication links with the vehicular computing device 108, with each other, and/or with controller 156 via RAN 152, among other possibilities.

Each of the radio communication devices 105, 107 may be any mobile computing device used for infrastructure RAN or direct-mode media (e.g., voice, audio, video, etc.) communication via a long-range wireless transmitter and/or transceiver that has a transmitter transmit range on the order of miles (e.g., 0.5-50 miles, or 3-20 miles and in comparison to a short-range transmitter such as a Bluetooth, Zigbee, or NFC transmitter) with other mobile computing devices and/or the infrastructure RAN 152. The long-range transmitter may implement a direct-mode, conventional, or trunked land mobile radio (LMR) standard or protocol such as ETSI Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long range transmitter may implement a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, the long-range transmitter may implement a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

In addition to or as an alternative to the long-range transmitter or transceiver, each radio communication device 105, 107 (hereinafter, radios) may further contain a short-range transmitter or transceiver that has a transmitter transmit range on the order of meters (e.g., such as a Bluetooth, Zigbee, or NFC, or Ultra Wide Band (UWB) connection having a transmit range on the order of 0.01-100 meters, or 0.1-10 meters) for communicating with each other or with other computing devices such as vehicular computing device 108. Each radio communication device 105, 107 (also referred to herein simply as 'radios' 105, 107) may further contain one or more physical electronic ports (such as a USB port, an Ethernet port, an audio jack, etc.) for direct electronic coupling with other computing devices such as vehicular computing device 108 or for coupling with other accessories such as a radio speaker microphone (RSM).

Each radio 105, 107 may additionally contain a push to talk (PTT) button that enables transmission of voice audio captured at a microphone of the radio 105, 107 to be transmitted via its short-range or long-range transceiver to other radio communication devices or to other computing devices such as dispatch console 158 via RAN 152, and enables reception of voice audio (when not depressed) received at the radio communication device via its long-range or short-range receiver and played back via a speaker of the radio communication device. In those embodiments where the radio communication device is a full-duplex device, instead of a half-duplex device, depression of the PTT button may allow simultaneous transmission and reception of voice audio, instead of mere reception, among other communication media types such as video. Each radio communication device 105, 107 may further include a display screen for displaying images, video, and/or text to the users/first and second officers 104, 106 or to someone else. Such a display screen may be, for example, a liquid crystal display (LCD) screen or an organic light emitting display (OLED) display screen. In some embodiments, a touch sensitive input interface may be incorporated into the display screen as well, allowing the users/first and second officers 104, 106 to interact with content provided on the display screen. A soft PTT input may also be provided, for example, via such a touch interface. Furthermore, a video camera may be provided at each radio communication device 105, 107, integrating an ability to capture images and/or video and store the captured image data (for further analysis) or transmit the captured image data as an image or video stream to the vehicular computing device 108, to other radio communication devices, and/or to other computing devices via RAN 152.

Vehicular computing device 108 may be any computing device specifically adapted for operation within the vehicle 102, and may include, for example, a vehicular console computing device, a tablet computing device, a laptop computing device, or some other computing device commensurate with the rest of this disclosure and may contain many or all of the same or similar features as set forth above with respect to radios 105, 107. In some embodiments, the vehicular computing device 108 may form a hub of communication connectivity for one or more of the associated radio communication device 105, 107, the driver's head and/or eye-tracking device 110, the integrated vehicular appliance 120, the external lights 122, 124, and/or the internal and external speakers 109, 126, each of which may be communicatively coupled to the vehicular computing device 108 via one or both of a wired communication link and a short-range wireless communication link. The vehicular computing device 108 may further include or have access to a transceiver and may be coupled to antenna 112 and through which the vehicular computing device 108 itself and the above-mentioned other devices may further communicate with or be accessed by a long-range wireless communication link with RAN 152, such as via LTE or LMR.

Internal speaker 109 is an audio-output device communicatively coupled to the vehicular computing device 108, and perhaps indirectly paired to one or both of the radio communication device 105, 107, for playing back audio such as a public safety tone, series of tones, or spoken words that may then be perceived by occupants within the vehicle such as the first officer 104 and/or the second officer 106. In some embodiments, internal speaker 109 may be replaced with a plurality of internal speakers displaced throughout the internal cabin of the vehicle 102 and selectively enabled in accordance with a detected breach of a particularly sized vehicular geofence surrounding the vehicle such that a particular one of the plurality of speakers closest to the breach is selected to playback the tone, spoken notification, or other type of speech output to indicate a relative direction of the breach.

The driver's head and/or eye-tracking device 110 may be any optical and/or mechanical system for identifying and determining a direction of intent of the first officer 104 with respect to one or both of a first video recording trigger and a second video recording trigger and for providing head and/or gaze direction information in one or more electronic messages to another computing device for further processing, such as the vehicular computing device 108 or the integrated vehicular appliance 120, and/or to remote computing device such as the controller 156 via RAN 152, among other possibilities.

For example, and as illustrated in FIG. 1, the driver's head and/or eye-tracking device 110 may be a rear-facing (in relation to the rear of the car) optical recording device that is capable of tracking a location of the driver's head and/or eye gaze and determining, based on the optical tracking, a direction in which the first officer 104 is looking (where 0° is directly forward and out of the page in the figure and where 90° is tangentially to the first officer's 104 left in a direction opposite the direction of second officer 106). For example, the rear-facing camera may optically track the first officer's 104 gaze using infrared light reflections to track movements in a center of the pupil, front of the cornea, and/or back of the lens, or by tracking movements in detected retinal blood vessels. In other embodiments, the rear-facing camera may use face-detection on captured 2D images to detect a direction in which the first officer's 104 face is directed. Still further, a depth camera may be use face detection on captured 3D depth images to detect a direction in which the first officer's 104 face is directed. Other possibilities for optical tracking exist as well.

The integrated vehicular appliance 120 is a communicatively coupled set of one or more electronic ranging devices that may include one or more capture-only devices and/or one or more emit and capture devices. More specifically, the set of one or more electronic ranging devices may include one or more of visible-light capture camera(s), infrared capture camera(s), time-of-flight depth camera(s), radio wave distancing device(s), and/or light detection and ranging (LiDAR) device(s), among other possibilities. The integrated vehicular appliance 120 is physically coupled to the vehicle 102, such as centrally positioned atop the vehicle 102 as illustrated in FIG. 1, or in other embodiments, may be distributed amongst various satellite locations around the vehicle and wiredly or wirelessly coupled to a centralized processing device such as an enclosure same or similar to that illustrated in FIG. 1 as the integrated vehicular appliance 120 or perhaps to the vehicular computing device 108, among other possibilities. When disposed in a distributed fashion, portions of the integrated vehicular appliance 120 may be disposed in other parts of the vehicle 102, such as in the external lights 122 and 124 (which in other embodiments not illustrated may take the form of an elongated light bar positioned atop the vehicle 102), within one or more side or rear view mirrors, integrated into a rear-view camera, or other locations or devices distributed across the internal or external portions of the vehicle 102 and having a view surrounding the vehicle 102.

The integrated vehicular appliance 120 is configured, by itself or in cooperation with vehicular computing device 108, to detect a breach of a particularly sized electronic vehicular geofence surrounding the vehicle. The integrated vehicular appliance 120 may be continuously on and leveraging its electronic ranging devices to detect a breach of the particularly sized vehicular geofence surrounding the vehicle, may only periodically be turned on at a regular or semi-regular cadence to detect whether any breaches of the particularly sized vehicular geofence surrounding the vehicle have occurred, or may be trigged to begin scanning for breaches of the particularly sized vehicular geofence surrounding the vehicle upon occurrence of some other trigger detected at the integrated vehicular appliance 120 or vehicular computing device 108, or upon receipt of an instruction from, for example, the vehicular computing device 108 or the RAN 152, among other possibilities consistent with the remainder of this disclosure.

The one or more electronic ranging devices may comprise a single scanning device having a field of view of less than 360° and that is then caused to rotate and scan at a particular frequency, such as rotating 1-10 times or more per second to create a 360° field of view of the area surrounding the integrated vehicular appliance 120 and thus the vehicle 102 to which it is attached. In other embodiments, a plurality of range detection devices, each having a field of view less than 360°, may be statically placed around the integrated vehicular appliance 120 or in a distributed manner around the vehicle 102 as set forth earlier, to altogether enable a 360° field of view of the area surrounding the integrated vehicular appliance 120 and thus the vehicle 102 to which it is attached. In still other embodiments, and for both visible or infrared light imaging systems and radio-wave imaging systems, complex optics and/or waveguides may be used to enable capture of a 360° field of view in a single static light imaging or radio wave detection sensor, for example, after which image processing or radiometry processing algorithms may be used to de-warp or otherwise compensate for distortions introduced into the captured data by the optics and/or waveguides, as necessary. As just one example, and as illustrated in FIG. 1, the integrated vehicular appliance 120 may include one or more static visible light imaging devices 120A-C each having an approximate 90° field of view (and further including a fourth imaging device facing backwards and not illustrated in FIG. 1) that may be combined optically or digitally at the integrated vehicular appliance 120 or the vehicular computing device 108 to provide visible-light imaging functionality across a 360° field-of-view, and may further include an active scanning RADAR emitter and detector 120D (or other radio-wave distancing device, although further examples below will use RADAR as the exemplary radio-wave distancing device) positioned above the visible light imaging devices 120A-C so as to provide both light-imaging and radio wave reflection range detection capabilities. Other arrangements and combinations are possible as well.

Data produced by the electronic ranging devices may then be used at the integrated vehicular appliance 120 and/or the vehicular computing device 108 to determine a range (relative to the vehicle 102) of one or more objects approaching the vehicle, perhaps in addition to other characteristics of the approaching object (or some other static or moving object) including but not limited to, a cross-sectional shape, an initial position, a current position, a velocity, an acceleration, a bearing, and/or a size (length, width, and/or height) of the object. The integrated vehicular appliance 120 and/or the vehicular computing device 108 may also then use the characteristics to predict a future location, path, trajectory, or status of the object. Such characteristics may additionally or alternatively be used to classify the object as a person (including type of person such as adult or child), vehicle (including type of vehicle such as car, motorcycle, or airborne drone), animal (including type of animal such as cat or dog), or other type of object. Such characteristics, predictions, and classifications may be stored in a memory at the integrated vehicular appliance 120 and/or the vehicular computing device 108 accompanying or separate from an image, point cloud, or echo map illustrative of the object or objects detected by the electronic ranging devices. The characteristics, predictions, and classifications and/or the image, point cloud, or echo maps may be stored at the integrated vehicular appliance 120 and/or the vehicular computing device 108, and/or may be transmitted to a separate storage or processing device (such as controller 156, dispatch console 158, or cloud computer cluster 160) via infrastructure RAN 152, among other possibilities.

Each of the electronic ranging devices may have an associated ranging function associated with it for determining an approximate range of a detected object from the integrated vehicular appliance 120 and thus the vehicle 102. For example, for visible light or infrared light imaging devices incorporated into integrated vehicular appliance 120, pre-configured portions of the captured image frames may be associated with particular distances. For example, a lower quarter of the frame, perhaps identified via pixel count, may be associated with a distance of 5-10 m (or 7 m) from the vehicle, while a second quarter of the frame may be associated with a distance of 10-20 m (or 15 m) from the vehicle, and a remainder of the frame associated with indeterminate distances or above-horizon distances. Such mappings between frame portions and distances may be varied based on parameters such as pan, tilt, zoom settings (if any) of the imaging cameras, a detected orientation of the vehicle 102 and/or integrated vehicular appliance 120 beyond level, or other detected variations. In still other embodiments, direct mappings may not be used, but instead, analytics applied to capture images that use known or learned sizes of known or learned objects detected in the frame to calculate relative distances from the vehicle 102 or integrated vehicular appliance 120 to detected objects. For example, other vehicles or other people captured in the frame may be compared to known or average sizes of such objects to then infer a distance in the image to a particular detected object. Other methods of determining a distance to an object in a captured image could be used as well. On the other hand, for emission and detection systems such as LiDAR and RADAR, time of flight information measured from the time of emission to the time of detection, and knowledge/pre-configuration of the speed of such emissions through air, may be used to directly calculate an estimated distance from the vehicle 102 or integrated vehicular appliance 120 to detected objects.

External lights 122, 124 may be any type of externally-perceivable visible light and may include an underlying LED, incandescent, and/or halogen lamp whose light output is constant and unidirectional or which may be modulated into a strobe, directional rotating, blinking, or otherwise non-static and/or focused output, and may comprise a white or colored (e.g., red, blue, etc.) light. While external lights 122, 124 are depicted in FIG. 1 as separately placed individual lights, in other embodiments, light bars that span substantially the entire width of the roof of the vehicle 102 with a number of same or different sized and/or colored lights in various matrix arrays may be included as well.

External speaker 126 is a speaker, such as a horn or siren, including an amplifier that broadcasts an externally-perceivable audio output such as a public safety tone, series of tones, or spoken words that may be perceived by exited vehicle occupants, officers, civilians, or suspects nearby while outside of the vehicle 102. In some embodiments, and similar to the internal speaker 109, the external speaker 126 may be replaced with a plurality of speakers displaced throughout the external body of the vehicle 102 and selectively enabled in accordance with a detected breach of the particularly sized vehicular geofence surrounding the vehicle 102 such that a particular one of the plurality of speakers closest to the breach is selected to playback a tone, spoken notification, or other type of speech output to indicate a relative direction of the breach or selectively enabled in accordance with a detected location of officers (such as first and second officers 104, 106) located in an area outside of the vehicle 102 such that a particular one of the plurality of speakers closest to the detected location of the officer or officers is selected to playback a tone, spoken notification, or other type of speech output to indicate a breach. In still other embodiments, a physical pan, tilt mechanism may be used to effect directionality of sound emitting from directional external speaker 126, while in other embodiments, a plurality of speakers in a matrix configuration may be used to beam steer audio output from the external speaker 126 to a particular location commensurate with the location of the breach or the location of an exited vehicle occupant, officer, civilian, or suspect. Other possibilities exist as well.

Infrastructure RAN 152 may implement over wireless link(s) 140 a narrowband wireless system such as a conventional or trunked LMR standard or protocol, which may include an ETSI DMR, a P25 standard defined by the APCO, TETRA, or other LMR radio protocols or standards. In other embodiments, infrastructure RAN 152 may additionally or alternatively implement over wireless link(s) 140 a broadband wireless system such as an LTE protocol including MBMS, an OMA-PoC standard, a VoIP standard, or a PoIP standard. In still further embodiments, infrastructure RAN 152 may additionally or alternatively implement over wireless link(s) 140 a Wi-Fi protocol perhaps in accordance with an IEEE 802.11 standard (e.g., 802.11a, 802.11b, 802.11g) or a WiMAX protocol perhaps operating in accordance with an IEEE 802.16 standard. Other types of wireless protocols could be implemented as well.

The infrastructure RAN 152 is illustrated in FIG. 1 as providing coverage for the vehicle 102 and its occupants via a single fixed terminal 154 coupled to a controller 156 (e.g., radio controller, call controller, PTT server, zone controller, MME, BSC, MSC, site controller, Push-to-Talk controller, or other network device) and including a dispatch console 158 operated by a dispatcher. In other embodiments, more or different types of fixed terminals may provide RAN services to the vehicle 102 and its vehicle occupants and may or may not contain a separate controller 156 and/or dispatch console 158.

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) technique.

OMA-PoC, in particular and as one example of an infrastructure broadband wireless application, enables familiar PTT and "instant on" features of traditional half-duplex mobile devices, but uses mobile devices operating over modern broadband telecommunications networks. Using OMA-PoC, wireless mobile devices such as mobile telephones and notebook computers can function as PTT half-duplex mobile devices for transmitting and receiving. Other types of PTT models and multimedia call models (MMCMs) could be used as well.

Floor control in an OMA-PoC session is generally maintained by a PTT server that controls communications between two or more wireless mobile devices. When a user of one of the mobile devices keys a PTT button, a request for permission to speak in the OMA-PoC session is transmitted from the user's mobile device to the PTT server using, for example, a real-time transport protocol (RTP) message. If no other users are currently speaking in the PoC session, an acceptance message is transmitted back to the user's mobile device and the user can then speak into a microphone of the device. Using standard compression/decompression (codec) techniques, the user's voice is digitized and transmitted using discrete auditory data packets (e.g., together which form an auditory data stream over time), such as according to RTP and internet protocols (IP), to the PTT server. The PTT server then transmits the auditory data packets to other users of the PoC session (e.g., to other mobile devices in the group of mobile devices or talkgroup to which the user is subscribed), using for example, one or more of a unicast, point to multipoint, or broadcast communication technique.

Infrastructure LMR wireless systems, on the other hand, may operate in either a conventional or trunked configuration. In either configuration, a plurality of mobile devices is partitioned into separate groups of mobile devices. In a conventional narrowband radio system, each mobile device in a group is selected to a particular radio channel (frequency or frequency & time slot) for communications associated with that mobile device's group. Thus, each group is served by one channel, and multiple groups may share the same single frequency (in which case, in some embodiments, group IDs may be present in the group data to distinguish between groups using the same shared frequency).

In contrast, a trunked narrowband radio system and its mobile devices use a pool of traffic channels for virtually an unlimited number of groups of mobile devices (e.g., talkgroups). Thus, all groups are served by all channels. The trunked radio system works to take advantage of the probability that not all groups need a traffic channel for communication at the same time. When a member of a group requests a call on a control or rest channel on which all of the mobile devices at a site idle awaiting new call notifications, in one embodiment, a call controller assigns a separate traffic channel for the requested group call, and all group members move from the assigned control or rest channel to the assigned traffic channel for the group call. In another embodiment, when a member of a group requests a call on a control or rest channel, the call controller may convert the control or rest channel on which the mobile devices were idling to a traffic channel for the call, and instruct all mobile devices that are not participating in the new call to move to a newly assigned control or rest channel selected from the pool of available channels. With a given number of channels, a much greater number of groups can be accommodated in a trunked radio system as compared with a conventional radio system.

Group calls may be made between wireless and/or wireline participants in accordance with either a narrowband or a broadband protocol or standard. Group members for group calls may be statically or dynamically defined. That is, in a first example, a user or administrator working on behalf of the user may indicate to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., mobile devices) could be provisioned in the network by the user or an agent, and then provided some form of group identity or identifier, for example. Then, at a future time, an originating user in a group may cause some signaling to be transmitted indicating that he or she wishes to establish a communication session (e.g., group call) with each of the pre-designated participants in the defined group. In another example, mobile devices may dynamically affiliate with a group (and also disassociate with the group) perhaps based on user input, and the switching and/or radio network may track group membership and route new group calls according to the current group membership.

The controller 156 illustrated in FIG. 1, or some other backend electronic computing device existing on-premises or in the remote cloud compute cluster 160 accessible via an IP network (such as the Internet), may additionally or alternatively operate as a back-end electronic digital assistant, a back-end audio and/or video (or point map or echo map) processing electronic computing device, and/or a remote cloud-based storage device consistent with the remainder of this disclosure.

b. Device Architecture

Figure 2:
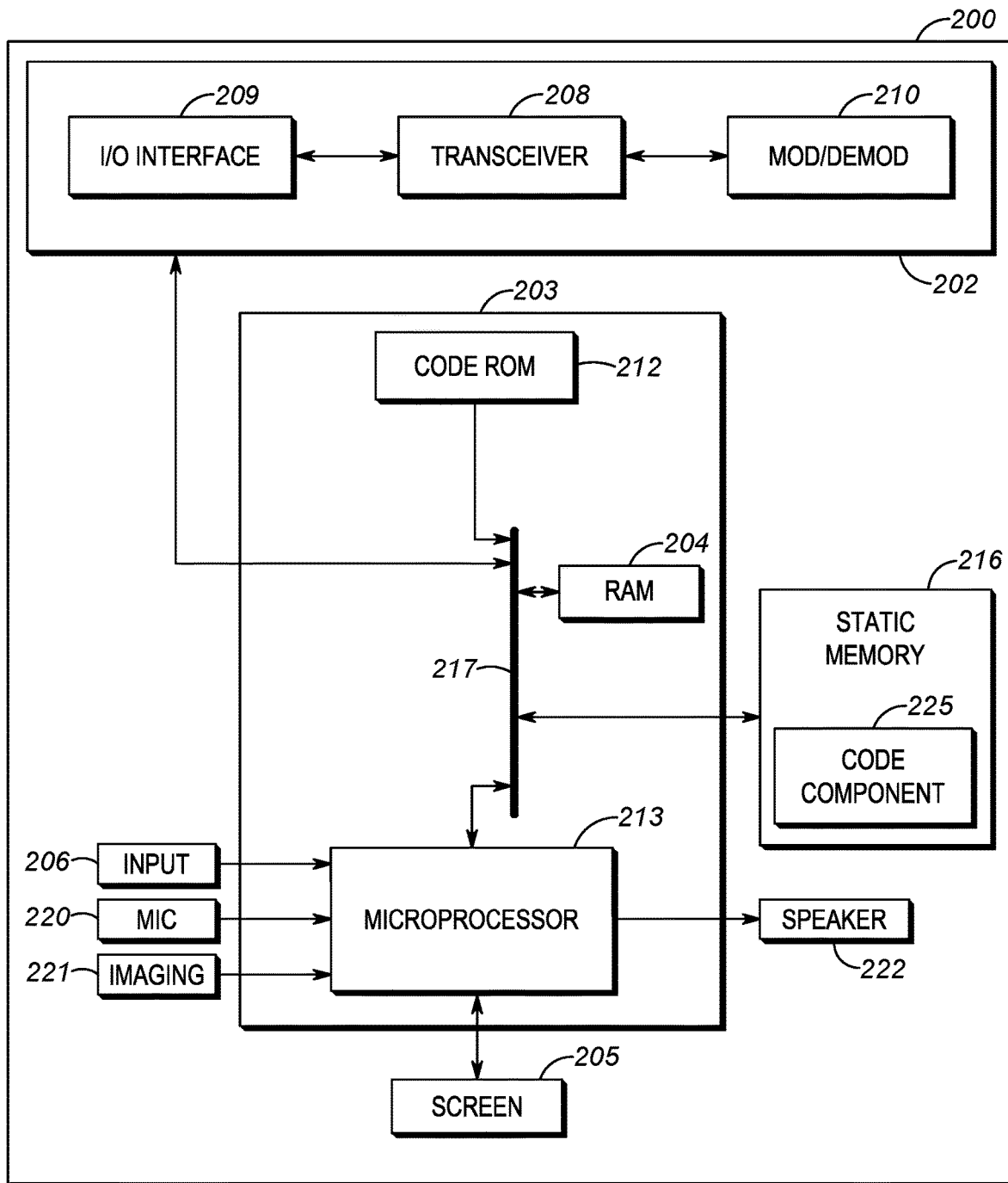
FIG. 2 is a device diagram showing a device structure of an electronic computing device for dynamic vehicular threat detection perimeter modification for an exited vehicular occupant, in accordance with an embodiment.

Now referring to FIG. 2, a schematic diagram illustrates an electronic computing device 200 according to some embodiments of the present disclosure. The electronic computing device 200 may be, for example, embodied in the radios 105, 107, the vehicular computing device 108, the integrated vehicular appliance 120, the infrastructure controller 156, the dispatch console 158, one or more computing devices in the cloud computing cluster 160, or some other communication device not illustrated in FIG. 1, and/or may be a distributed communication device across two or more of the foregoing (or multiple of a same type of one of the foregoing) and linked via a wired and/or wireless communication link(s), and may also be referred to herein as an electronic processing system.

While FIG. 2 may represent the devices as described above with respect to FIG. 1, depending on the type of the device, the electronic computing device 200 or other devices may include fewer or additional components in configurations different from that illustrated in FIG. 2. For example, in some embodiments, the electronic computing device 200 acting as the infrastructure controller 156 of FIG. 1 may not include one or more of the screen 205, microphone 220, imaging device 221, and speaker 222. As another example, in some embodiments, the electronic computing device 200 acting as the radio 105, 107 or vehicular computing device 108 of FIG. 1 may further include a location determination device (for example, a global positioning system (GPS) receiver or local RF triangulation techniques using BT BTLE, WiFi, UWB, 4G/5G PoLTE, etc.). As still another example, in some embodiments, the electronic computing device 200 acting as the integrated vehicular appliance 120 of FIG. 1 may not include the microphone input 220, the screen 205, the user interface input 206, and the speaker 222. Other combinations are possible as well.

As shown in FIG. 2, the electronic computing device 200 includes a communications unit 202 coupled to a common data and address bus 217 of a processing unit 203. The electronic computing device 200 may also include one or more input devices (for example, keypad, pointing device, touch-sensitive surface, button, a microphone 220, an imaging device 221, and/or a user input interface device 206) and an electronic display screen 205 (which, in some embodiments, may be a touch screen and thus also acts as an input device), each coupled to be in communication with the processing unit 203.

The microphone 220 may be present for capturing audio from a user and/or other environmental or background audio that is further processed by processing unit 203 in accordance with the remainder of this disclosure and/or is transmitted as voice or audio stream data, or as acoustical environment indications, by communications unit 202 to other portable radios and/or other communication devices. The imaging device 221 may provide video (still or moving images) or radio echo maps or point cloud maps of an area in a field of view of the electronic computing device 200 for further processing by the processing unit 203 and/or for further transmission by the communications unit 202. A speaker 222 may be present for reproducing audio that is decoded from voice or audio streams of calls received via the communications unit 202 from other portable radios, from digital audio stored at the electronic computing device 200, from other ad-hoc or direct mode devices, and/or from an infrastructure RAN device, or may playback alert tones or other types of pre-recorded audio.

The processing unit 203 may include a code Read Only Memory (ROM) 212 coupled to the common data and address bus 217 for storing data for initializing system components. The processing unit 203 may further include an electronic processor 213 (for example, a microprocessor or another electronic device) coupled, by the common data and address bus 217, to a Random Access Memory (RAM) 204 and a static memory 216.

The communications unit 202 may include one or more wired and/or wireless input/output (I/O) interfaces 209 that are configurable to communicate with other communication devices, such as the radio 105, 107, the wireless RAN 152, and/or the vehicular computing device 108, over which incoming calls may be received and over which communications with remote databases and/or servers may occur.

For example, the communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (for example, 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network.

The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The electronic processor 213 has ports for coupling to the display screen 205, the microphone 220, the imaging device 221, the user input interface device 206, and/or the speaker 222. Static memory 216 may store operating code 225 for the electronic processor 213 that, when executed, performs one or more of the blocks set forth in FIGS. 3 and/or 6 and the accompanying text(s). The static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, and the like.

In examples set forth herein, the controller electronic computing device 200 is not a generic computing device, but a device specifically configured to implement functionality for dynamic vehicular threat detection perimeter modification for a movable vehicle. For example, in some examples, the electronic computing device 200 specifically comprises a computer executable engine configured to implement functionality for dynamic vehicular threat detection perimeter modification for an exited vehicular occupant.

2. PROCESSES FOR DYNAMIC VEHICULAR THREAT DETECTION PERIMETER MODIFICATION FOR AN EXITED VEHICULAR OCCUPANT

Figure 3:
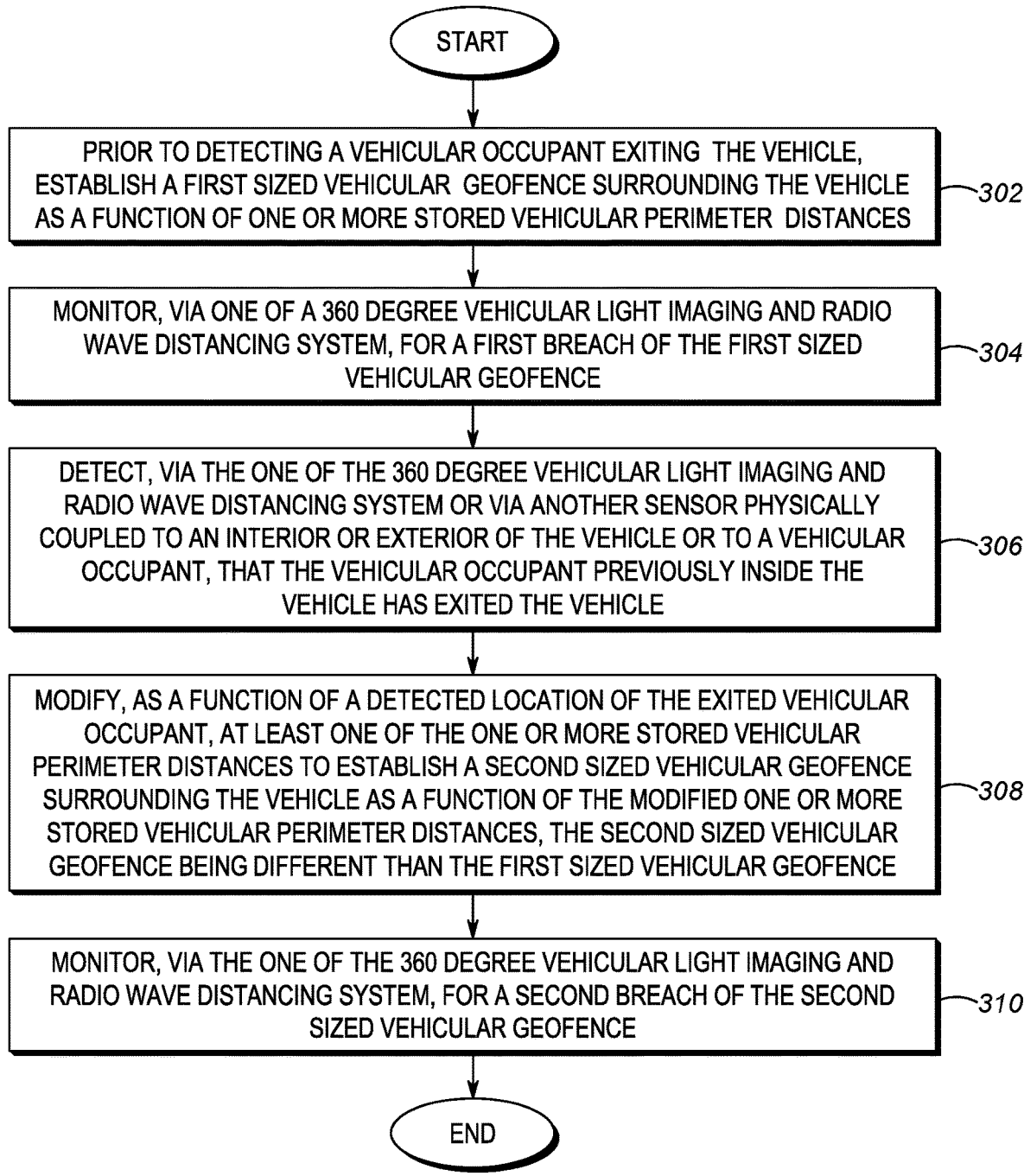
FIG. 3 illustrates a flow chart setting forth process blocks for dynamic vehicular threat detection perimeter modification for an exited vehicular occupant, in accordance with an embodiment.
Figure 4:
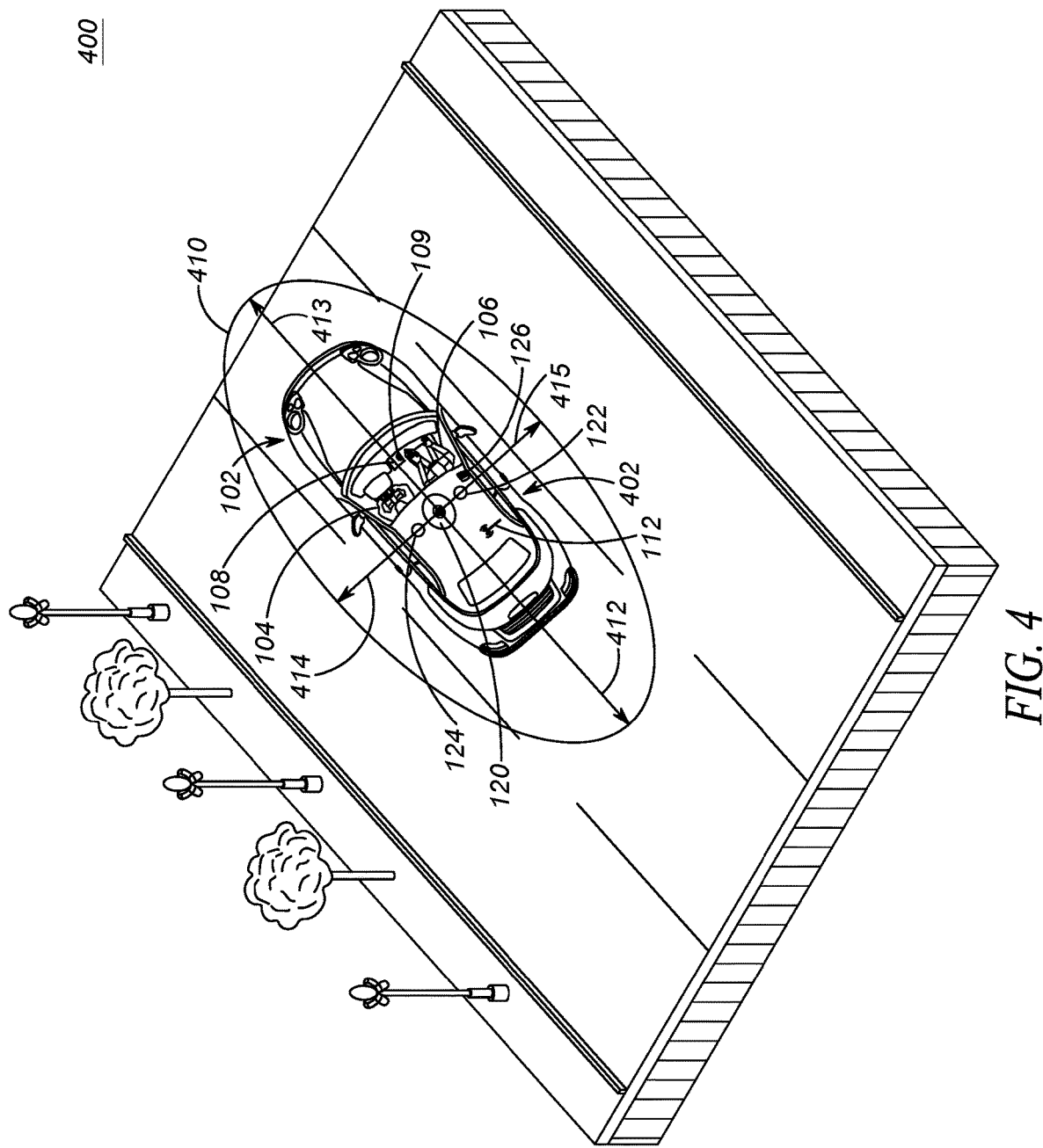
FIG. 4 is a perspective view illustrating a first example of dynamic vehicular threat detection perimeter modification for an exited vehicular occupant prior to detecting an occupant existing the vehicle, in accordance with an embodiment.
Figure 5:
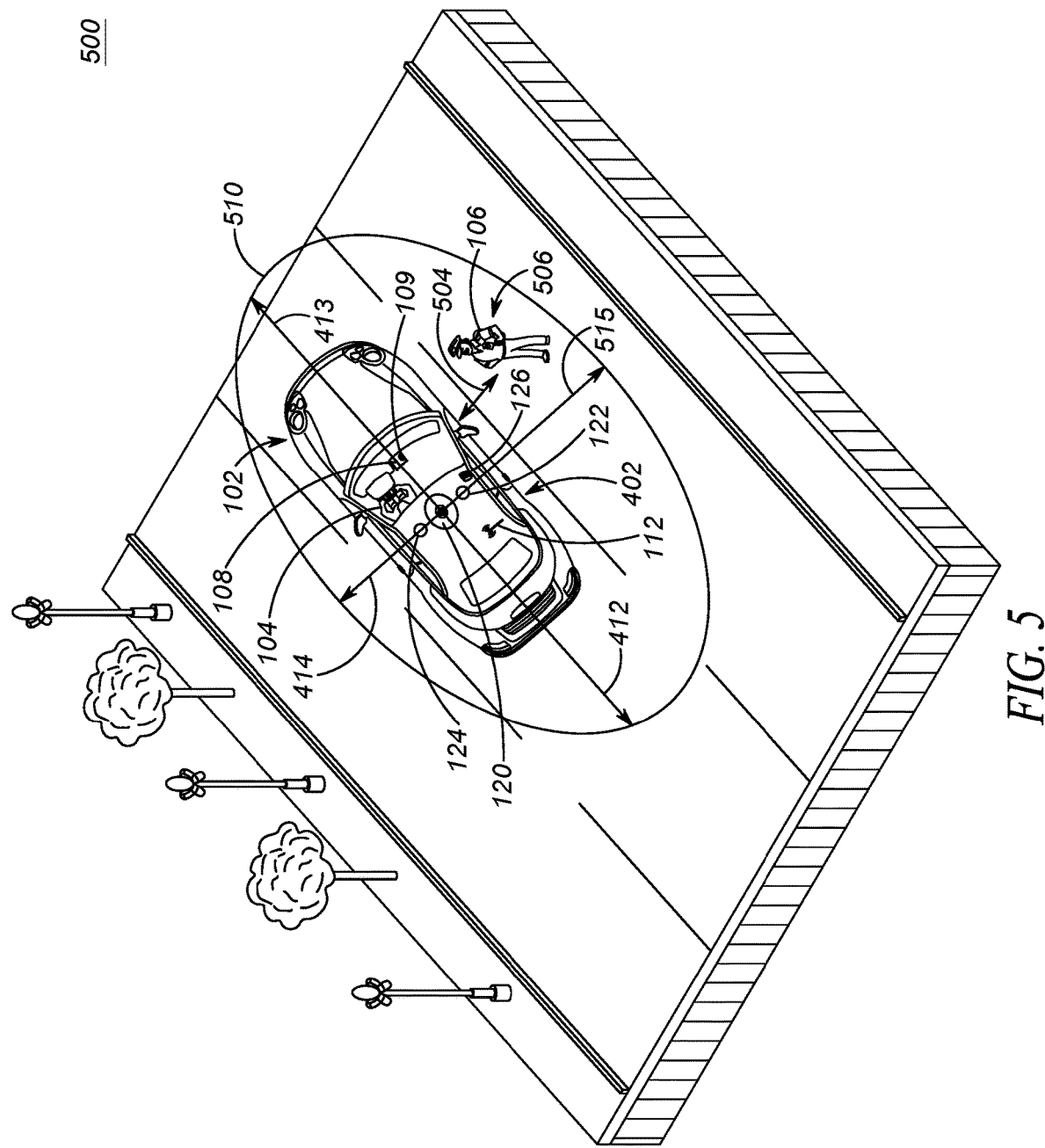
FIG. 5 is a perspective view illustrating the first example of dynamic vehicular threat detection perimeter modification for an exited vehicular occupant after detecting an occupant existing the vehicle, in accordance with an embodiment.

Turning now to FIG. 3, a flow chart diagram in FIG. 3 illustrates a process 300 for dynamic vehicular threat detection perimeter modification for a movable vehicle. FIGS. 4-5 set forth perspective views illustrating various blocks of process 300 in example scenarios. While a particular order of processing blocks, message receptions, and/or message transmissions is indicated in FIG. 3 for exemplary purposes, timing and ordering of such blocks, receptions, and transmissions may vary where appropriate without negating the purpose and advantages of the examples set forth in detail throughout the remainder of this disclosure. A corresponding electronic computing device, such as the vehicular computing device 108 of FIG. 1 and/or the electronic computing device 200 of FIG. 2, and embodied as a singular electronic computing device or distributed electronic computing device making up an electronic processing system as set forth earlier, may execute process 300.

Process 300 begins at block 302 where, prior to detecting a vehicular occupant exiting a vehicle, an electronic computing device establishes a first sized vehicular geofence surrounding the vehicle as a function of one or more stored vehicular perimeter distances. The first sized vehicular geofence could be established responsive to detecting that the vehicle has stopped at a vehicle destination location, perhaps via retrieving a determined current GPS location of the vehicle via a GPS receiver integrated with or in electronic communication with the electronic computing device (or localized RF triangulation using 5G PoLTE (Positioning over LTE from the 3GPP standard)), or via image or video analytics operating at a coupled image capture device such as one operating at the integrated vehicular appliance 120 of FIG. 1 that may recognize cross-streets or building addresses or business names, that can be associated with a current vehicle destination location of the vehicle) and cross-referencing with an intended destination of the vehicle (such as an entered destination address in a navigation application running at or in communication with the electronic computing device, or an intended or assigned incident location entered by a user at the electronic computing device or received from a dispatcher at a dispatch console such as dispatch console 158 as illustrated in FIG. 1).

In still further embodiments, the first sized vehicular geofence could be established by manual activation of a vehicular geofence threat detection function via user activation of a particular hard or soft input button or switch integrated with or in communication with the electronic computing device and associated with enablement of the vehicular geofence threat detection function (and perhaps made available via a display screen at a vehicular console within the vehicle or via a hard button or switch of a physical vehicular console within the vehicle).

In still further embodiments, the first sized vehicular geofence could be established responsive to a detected stopping of the vehicle detected via a gyroscope-based motion sensing device integrated in the vehicular computing device or communicatively coupled to the electronic computing device, or a detected placement of the vehicle transmission into park. Other possibilities for triggering the establishment of the first sized vehicular geofence exist as well.

The one or more stored vehicular perimeter distances used to establish the first sized vehicular geofence may be default parameters stored locally at the electronic computing device and used to compare against breach distances detected by one or more electronic ranging devices such as at the integrated vehicular appliance 120 of FIG. 1 and provided to the electronic computing device, or may be a value or values provided by the electronic computing device to the one or more electronic ranging devices that may be used by the electronic ranging devices to determine when breach notifications should be provided to the electronic computing device, among other possibilities.

The one or more vehicular perimeter distances may be, for example, a single value that essentially establishes a sized vehicular geofence having a substantially even radius (e.g., a circular-shaped sized vehicular geofence) surrounding the vehicle. As just one example, where the one or more electronic ranging devices is made up of a plurality of distributed ranging devices in the manner set forth earlier, providing the same single vehicular perimeter distance to each electronic ranging device for the purposes of filtering detected breaches, or applying the same single vehicular perimeter distance value to notifications of breaches from each of the ranging devices, would provide a sized vehicular geofence substantially approaching a circle shape.

In an embodiment such as that set fourth in FIG. 1 where the integrated vehicular appliance 120 contains four electronic ranging devices, a same first vehicular perimeter distance may be applied to all electronic ranging devices (e.g., front and back and side to side).

In other examples, the same first vehicular perimeter distance may be applied to only a subset of the four electronic ranging devices, so that the overall sized vehicular geofence is formed of four non-overlapping or perhaps somewhat overlapping (e.g., by 1-15 degrees) quarter circular arcs. In still other examples, every ranging device may be associated with a different vehicular perimeter distance, creating separate zones dependent on the configuration and number of the electronic ranging devices. Other arrangements are possible as well.

In other examples, a sized vehicular geofence may be formed using two perimeter distances (e.g., such as length and width) that establishes varying distances surrounding the vehicle. Using the same example just described where the one or more electronic ranging devices are made up of a plurality of distributed electronic ranging devices in the manner set forth in FIG. 1, providing a first same vehicular perimeter distance to first opposing distributed ranging devices (such as on the sides of the vehicle) and a second same perimeter distance different from the first perimeter distance to second opposing distributed ranging devices (such as at a front and rear of the vehicle) for the purposes of detecting breaches, or applying the first same vehicular perimeter distance value to notifications of breaches from each of the first opposing distributed ranging devices and applying the second same vehicular perimeter distance value to notifications of breaches from each of the second opposing distributed ranging devices, would provide a sized vehicular geofence substantially approaching an oval shape. In an embodiment such as that set forth in FIG. 1 where the integrated vehicular appliance 120 contains four electronic ranging devices, a same first vehicular perimeter distance may be applied to oppositely electronic ranging devices (e.g., front and back or side to side) and a same second (but different from the first) vehicular perimeter distance may be applied to oppositely positioned electronic ranging devices (e.g., the other of front and back or side to side).

Other more complex shapes using additional perimeter distances and additional electronic ranging devices could be used as well, including examples where the center of the sized geofence is offset (e.g., in the range of 0-4 meters) from a center of the vehicle to emphasize a particular half or quadrant of the vehicle perhaps closest to a detected driver or occupant or perhaps closest to a direction facing towards an incident location from the detected vehicle destination location, among other possibilities. And various configurations of electronic ranging devices may allow combined complex shapes such as dual circles or dual ovals centered at various points across the vehicle, among other possibilities, but determined via a combination of electronic ranging device configurations and stored and variable vehicular perimeter distance values stored at the electronic computing device, among other possible storage locations.

Default stored vehicular perimeter distances may be set to default values, such as 1-30 m or 15 m, or 1-15 m or 8 m, or may be made to vary based on other determined contexts, such as a real-time or historical crime rate associated with the vehicle destination location or an incident type associated with the vehicle destination location, among other possibilities. As just one example, the default stored vehicular perimeter distances of 1-15 or 8 m for low-level personal risk levels may be made to vary to 15-25 m or 20 m for medium personal risk levels and 25-35 m or 30 m for high personal risk levels. In still other embodiments, other events may also impact the perimeter distances used.

FIG. 4 sets forth an example perspective view 400 of the vehicle 102 of FIG. 1 in which the vehicle 102 has stopped at a vehicle destination location 402 and a first sized vehicular geofence 410 established as a function of one or more stored vehicular perimeter distances commensurate with block 302 prior to either first officer 104 or second officer 106 vehicle occupants existing the vehicle 102.

As illustrated in FIG. 4, the first sized vehicular geofence 410 is established having first and second vehicular perimeter distances 412, 413 having a first value of approximately 10 m measured from integrated vehicular appliance 120 (containing one or more electronic ranging devices as described with respect to FIG. 1) and having third and fourth vehicular perimeter distances 414, 415 having a second value of approximately 5 m measured from integrated vehicular appliance 120.

Once the first sized vehicular geofence 410 is established, and returning to FIG. 3, processing then proceeds to block 304, where the electronic computing device monitors for a first breach of the first sized vehicular geofence 410 via one of a 360 degree vehicular light imaging or RADAR distancing system physically coupled to the vehicle and communicably coupled to the electronic communication device, such as via the integrated vehicular appliance 120 described with respect to FIG. 1.

As noted earlier, monitoring for a breach of the first sized vehicular geofence 410 may be performed at the 360 degree vehicular light imaging or RADAR distancing system (such as the integrated vehicular appliance 120) or at an electronic computer device separate from but communicatively coupled to the 360 degree vehicular light imaging and RADAR distancing system (such as at the vehicular computing device 108 of FIG. 1 or electronic computing device 200 of FIG. 2). Any actual detection of a first breach (if any) of the first sized vehicular geofence 410 may be performed in any one or more of the ways as set forth earlier using one or both of the 360 degree vehicular light imaging and RADAR distancing systems, and in some embodiments, a breach detected via a first one of the 360 degree vehicular light imaging or RADAR distancing system may be used to confirm a breach detected via the other of the 360 degree vehicular light imaging or RADAR distancing system, among other possibilities.

In those embodiments where the distancing system that monitors for and detects the first breach is a visible light imaging system (or where another electronic computing device detects the breach may request the visible light imaging system to do so), the visible light imaging system may capture one or more images of the object or person that is detected to have breached the sized vehicular geofence, and may provide the captured one or more images to the electronic computing device for display or further transmission to other computing devices (such as, but not limited to, radio 105 or dispatch console 158). Where the visible light imaging system includes a plurality of offset electrical ranging/imaging devices, the image may be captured by the particular electrical ranging/imaging device that detected the breach and that has a less than 360 degree view (such as the visible light imaging device 120A having an approximate 90° field of view) or, where the visible light imaging system includes a 360 degree view and single imaging sensor, the image may be sub-sampled to a 30, 45, 60, or 90 degree view that includes the object detected to have breached.

In those embodiments where the distancing system that monitors for and detects the first breach is a RADAR distancing system (or where another electronic computing device detects the breach may request the RADAR distancing system to do so), the RADAR distancing system may generate (or the electronic computing device may generate using direction and ranging information provided by the RADAR distancing system) a 2-D or 3-D image of an area (e.g., entire 360 degree area or just the quadrant 90 degree or half 180 degree of the vehicle associated with the location of the detected breach, among other ranges) surrounding the vehicle (and which may include relative distance indicators) and use direction and ranging information provided by the RADAR distancing system to place a symbol indicative of the relative location (distance and direction) of the breach, and similarly provide the generated 2-D or 3-D image to the electronic computing device for display or further transmission to other computing devices (such as, but not limited to, radio 105 or dispatch console 158).

Processing then proceeds to block 306, where the electronic computing device detects, via one of the 360 degree vehicular light imaging or RADAR distancing system or via another sensor physically coupled to an interior or exterior of the vehicle or to a vehicular occupant, that the vehicular occupant previously inside the vehicle has exited the vehicle. As illustrated in the perspective view 500 of FIG. 5, the second officer 106 vehicle occupant that was previously in the vehicle 102 may exit the vehicle 102 to an exit location 506 a distance 504 (such as 1-2 m) outside the vehicle 102.

In one example of detecting that the vehicular occupant previously inside the vehicle has exited the vehicle, the 360 degree vehicular light imaging system (such as the integrated vehicular appliance 120 in FIG. 5) may detect movement or an object suddenly appearing immediately adjacent (e.g., within 1-2 m adjacent) the vehicle 102, and associate such detection with detecting that a vehicular occupant has exited the vehicle. In still other embodiments, additional image processing at the electronic computing device, the vehicular light imaging system (such as the integrated vehicular appliance 120 in FIG. 5) or elsewhere may apply a vehicular occupant matching algorithm or vehicular occupant classifier to detect a uniform, badge, hat, or other indicator (such as size or dimension of the object matching a human size or dimension) having a known stored association with vehicular occupants, and when a vehicular occupant image match or vehicular occupant classifier hit is detected immediately adjacent the vehicle such as vehicle 102 at block 306, may cause subsequent blocks of process 300 to be performed. Other ways of using light imaging to determine a vehicle exit are possible as well.

In another example, the 360 degree RADAR distancing system (such as the integrated vehicular appliance 120 in FIG. 5) may detect movement suddenly appearing immediately adjacent (e.g., within 1-2 m adjacent the vehicle) the vehicle 102 (where no object approaching the vehicle was previously detected), and associate such sudden detection in the threshold immediately adjacent area with detecting that a vehicular occupant has exited the vehicle. In still other embodiments, additional RADAR echo processing at the electronic computing device, the vehicular RADAR distancing system (such as the integrated vehicular appliance 120 in FIG. 5) or elsewhere may apply a sizing algorithm to detect that the object is of a human size, and only then cause subsequent blocks of process 300 to be performed. Other ways of using radio wave distancing to determine a vehicle exit are possible as well.

In still another example, some other sensor physically coupled to an interior or exterior of the vehicle may be used to detect that a vehicular occupant has exited the vehicle. For example, a physical door latch or door handle sensor (wiredly or wirelessly) communicably coupled to the electronic computing device may be used to receive a signal from and detect that an associated door has opened and infer that the associated vehicular occupant has exited the vehicle through the associated opened door. In other embodiments, a movement or light sensor within the door jamb itself may be (wiredly or wirelessly) communicably coupled to the electronic computing device and used to receive a signal from and detect that an associated door has opened and infer that the associated vehicular occupant has exited the vehicle through the associated opened door. In still other embodiments, an interior dome light sensor triggered responsive to a door opening may be also (wiredly or wirelessly) communicably coupled to the electronic computing device and used to detect that a door has opened and infer that a vehicular occupant has exited the vehicle through the opened door. Even further, a seat presence detector that may detect a presence of a driver or passenger in a seat due to a change in weight, for example, may be used to determine if a vehicle occupant is present in the vehicle in the first place, and may be further used to detected that a previously present vehicle occupant has now exited the vehicle, and provide corresponding signals to the electronic computing device such as the vehicular computing device 108 of FIG. 1 or electronic computing device 200 of FIG. 2. Other ways of using other sensors coupled to the vehicle to determine a vehicle exit are possible as well.

In a last example, some other sensor physically coupled to a vehicle occupant may be used to detect that a vehicular occupant has exited the vehicle. For example, a body camera such as a video camera integrated into radio 107 and physically coupled to the second officer 106 may include an image classifier associated with a front dash, instrument panel, or other interior features of the vehicle 102 and, responsive to determining that the classifier has transitioned from hitting on the corresponding interior vehicle elements to not triggering on the interior elements, may cause a signal to be provided to the electronic computing device indicating that the second officer 106 has exited the vehicle. A similar image classifier could instead be executed at the electronic computing device on image or video data received from the video camera of radio 107. Still further, a radio frequency identifier (RFID) circuit embedded in clothing, the radio 107, or other elements physically coupled to the second officer 106 may be read via an RFID reader integrated with the vehicle or some other electronic computing device disposed at an interior or exterior of the vehicle (and wiredly or wirelessly communicably coupled to the electronic computing device may), and may use short-range radio frequency ranging information to detect that the second officer 106 has moved a threshold distance away from the reader (such as 1-5 m) and responsively infer that the second officer 106 has exited the vehicle and responsively provide an electronic indication thereof to the electronic computing device. Still further, a set of three or more antennas disposed throughout an interior or exterior of the vehicle (and wiredly or wirelessly communicably coupled to the electronic computing device may) may be used to track radio emissions known (e.g., by a hardware or radio identifier or some other mechanism) to be associated with radio 107 associated with second officer 106 and use a triangulation technique to determine that the second officer 106 has moved a threshold distance away from the reader (such as 1-5 m) and responsively infer that the second officer 106 has exited the vehicle.

In some embodiments, the information or signals provided to or detected by the electronic computing device may merely provide information sufficient to identify which vehicle occupant has exited the vehicle (such as via a door sensor) and that provides some gross indication of an area (e.g., which side of the vehicle (180 degree area) or which quadrant of the vehicle (90 degree area)) at which the vehicular occupant has exited the vehicle, while in other embodiments, the information or signals provided to or detected by the electronic computing device may provide information sufficient to continue to track a location or motion vector of the exited vehicular occupant after exiting the vehicle (such as via the 360 degree vehicular light imaging or RADAR distancing system or RFID circuit and reader, among others) and may allow further modifications to stored vehicular painter distances to be made in accordance with subsequent detected locations and/or motion vectors of the exited vehicular occupant.

Referring again to FIG. 5, any one or more of the above noted mechanisms may be used, alone or in combination, to detect and/or to confirm, that the second officer 106, who was previously positioned inside the vehicle 102, has exited the vehicle 102 and is now outside the vehicle 102 (and, in some examples, is at exit location 506). As shown in FIG. 5, the first officer 104 vehicle occupant remains in the vehicle 102, however, in other embodiments, both the first officer 104 and second officer 106 may exit the vehicle 102, and same or similar processes as set forth herein applied to both individually and/or together in a serial or parallel fashion based on the timing of their detected exit.

Processing then proceeds to block 308, where the electronic computing device modifies, as a function of a detected location of the exited vehicular occupant, at least one (but less than all) of the one or more stored vehicular perimeter distances that, in cooperation with the electronic distancing devices, define the first sized vehicular geofence to establish a second sized vehicular geofence surrounding the vehicle as a function of the modified one or more stored vehicular perimeter distances, the second sized vehicular geofence being different than the first sized vehicular geofence.

The type and extent of the modification made at block 308 may depend on the type and amount of information received regarding the vehicular exit at block 306, the number of occupants exiting, and/or the configuration of the one of the 360 degree vehicular light imaging and radio wave distancing system(s).

As one example, and returning to FIG. 5, when the second officer 106 vehicular occupant is detected to have exited the vehicle 102, the stored vehicular perimeter distance 415 associated with electronic ranging device/visible light imaging device 120A (not illustrated in FIG. 5) pointing in a direction of the exiting second officer 106 at exit location 506 may be modified to increase the stored vehicular perimeter distance 415 (such as 5 m as set forth earlier) to a new larger stored vehicular perimeter distance 515 (e.g., 1.5-4× the initial size, such as to 15 m). In the event the first officer 104 vehicular occupant were similarly detected exiting the vehicle 102, the stored vehicular perimeter distance 414 associated with electronic ranging device 120C (not illustrated in FIG. 5) pointing in a direction of the exiting first officer 104 could be similarly modified.

Of course, there need not be a 1:1 relationship between electronic ranging devices and stored vehicular perimeter distances. Using the example of FIG. 5, if the integrated vehicular appliance 120 instead included a single 360 degree light imaging electronic distancing device or radio wave electronic distancing device, the stored vehicular perimeter distance 415 applied to only a sub-portion (e.g., 45, 90, or 180 degrees) of a captured image or echo map in the direction of the exiting first officer 104 may be similarly modified to increase the stored vehicular perimeter distance 415 (such as 5 m as set forth earlier) to a new larger stored vehicular perimeter distance 515 (e.g., 1.5-4× the initial size, such as to 15 m).

Again using the example of FIG. 5, if the integrated vehicular appliance 120 instead included dual 180 degree light imaging electronic distancing devices facing towards each side of the vehicle, a stored vehicular perimeter distance applied to only a sub-portion (e.g., 30, 45, 90, or 120 degrees of the 180 covered by the particular 180 degree light imager/electronic distancing device) of a captured image in the direction of the exiting first officer 104 may be similarly modified to increase the stored vehicular perimeter distance (such as 5 m as set forth earlier) to a new larger stored vehicular perimeter distance 515 (e.g., 1.5-4× the initial size, such as to 15 m).

Similar modifications may be applied at block 308 to sub-portions of an initially circular-shaped first sized vehicular geofence to create a second sized vehicular geofence having a non-circular shape, but instead, may appear to have two half-circles having different radii, or four quarter circles having different radii, and similar configurations for various other device structures. In this manner, a first sized vehicular geofence in which a same stored vehicular perimeter distance is applied to all distributed electronic distancing devices (or an entire range of a single 360 degree electronic distancing device) may be modified so that the same stored vehicular perimeter distance is applied to only a subset of all distributed electronic distancing devices (or a sub-range of the single 360 degree electronic distancing device), and newly modified/increased vehicular perimeter distances applied to remaining subset of electronic distancing devices (or respective remaining sub-range) in the direction of the exited vehicular occupant.

In some embodiments, where another sensor physically coupled to the interior or exterior of the vehicle is used at block 306 to detect the exiting vehicular occupant, a stored mapping may be referenced to determine which stored vehicular perimeter distance associated with which electronic distancing device should be modified. For example, and with reference to FIG. 5, detecting, via a passenger door sensor of vehicle 102 that the second officer 106 has exited the vehicle, may cause the electronic computing device to access a stored mapping that identifies the passenger door sensor as associated with the vehicular perimeter distance 415, and correspondingly modifies the vehicular perimeter distance 415 to the vehicular perimeter distance 515 at block 308. Other mappings are possible as well.

In other embodiments where an actual location of the exiting vehicular occupant can be identified, such as when the detection at block 306 is via one of the 360 degree vehicular light imaging and RADAR distancing system or via another sensor system that can provide updated location information of the exiting vehicular occupant outside the vehicle (such as the RFID solution or the triangulation solution noted earlier), the actual determined location of the exiting vehicular occupant may be used to more accurately determine which one or more vehicular perimeter distances to modify at block 308. Using the example set forth in FIG. 5, the electronic computing device may determine that the second officer 106 vehicular occupant at exit location 506 most closely maps to vehicular perimeter distance 415, and thus determines to modify vehicular perimeter distance 415 to increase it to vehicular perimeter distance 515 as shown. However, as the exited second officer 106 continues to move about the vehicle 102, and perhaps move to the front of the vehicle 102, the electronic computing device may make corresponding changes to the vehicular perimeter distance 515 to decrease it back to the vehicular perimeter distance 415 but also make corresponding changes to the vehicular perimeter distance 413 to increase it to a larger value instead (not shown in FIG. 5).

Processing then proceeds to block 310, where the electronic computing device monitors for a second breach of the second sized vehicular geofence via one of the 360 degree vehicular light imaging and RADAR distancing system physically coupled to the vehicle and communicably coupled to the electronic communication device, such as via the integrated vehicular appliance 120 described with respect to FIG. 1, in the same or similar way as set forth above in block 304.

During one or both of blocks 304 and 310, any actual detected first or second breach of the respective first or second sized vehicular geofence may cause a notification to be provided to vehicular occupants (while in the vehicle and/or after exiting the vehicle).

More specifically, the electronic computing device, responsive to detecting the first or second breach at either block 304 or 310, identifies one or more target electronic devices to notify of the respective detected breach. The identified one or more target electronic devices to notify of the detected breach may include at least one of (i) the target electronic device associated with the exited vehicular occupant, (ii) the target electronic device associated with the second vehicular occupant still in the vehicle, and (iii) the audio and/or visual output target electronic device fixed to the exterior or interior of the vehicle.

As one example for identifying one or more target electronic devices associated with a registered occupant of the vehicle, the vehicular computing device 108 of FIG. 1 acting as the electronic computing device may maintain an indication of active radios to which it is currently paired via a short-range wireless communication link or links, which in this example, may include radios 105 and 107 associated with vehicular occupants first and second officers 104 and 106. In some embodiments, the electronic computing device may be configured to notify all target electronic devices currently paired with the electronic computing device, while in other embodiments, the electronic computing device may selectively choose a subset of target electronic devices currently paired with the electronic computing device to notify of the breach.

The latter function may be illustrated with respect to the perspective view of FIG. 5, in which the second officer 106 carrying with him or her their associated radio 107 exits the vehicle 102 and remains in short-range communication range with vehicular computing device 108 of vehicle 102, may roam to exit location 506 as illustrated in FIG. 5.

When a subsequent breach of the second sized vehicular geofence 510 is detected via integrated vehicular appliance 120 as an unknown potential perpetrator (not illustrated) walks through the second sized vehicular geofence 510, the vehicular computing device 108 may use information regarding the location of the breach (as received from the integrated vehicular appliance 120) and information regarding the location of the first officer 104 (still in the vehicle) and second officer 106 (now exited at exit location 506) reported as GPS location information by radios 105, 107, among other possibilities, and select only the target electronic devices as those located within the same quadrant or an adjacent quadrant (as defined by perimeter distances and which may, in other embodiments, align with fields-of-view of electronic ranging devices) as the breach, or may select only the target electronic device located closest to the location of the breach such as second officer 106, among other possible sub-selections.

As a further example, the electronic computing device may determine if the detected breach would have breached the first sized vehicular geofence, and if so, only notify those vehicular occupants still in the vehicle via an associated target electronic device, or if the detected breach only breaches the modified second sized vehicular geofence, only notify those vehicular occupants that have exited the vehicle or whose current location or vehicle exit have caused the particular modification embodied by the second vehicular geofence to cause the breach to be detected.

As another example for identifying one or more target electronic devices associated with a registered occupant of the vehicle, the vehicular computing device 108 of FIG. 1 acting as the electronic computing device may access an assignment database, locally at the vehicular computing device 108 or remotely at the dispatch console 158, identifying a particular radio device associated with a first responder assigned to the vehicle or assigned to the incident at the vehicle location destination. For example, a CAD or dispatch record stored at dispatch console 158 or provided to vehicular computing device 108 upon dispatch or some other event, may identify a radio device such as radio 107 as associated with second officer 106 or as associated with the incident at the vehicular destination location at which the vehicle 102 is now located, and may use a hardware or network address of the radio 107 included in the record to identify the radio 107 as a target electronic device to notify.

Other electronic target devices, such as a radio associated with another officer on-scene (not illustrated) or with another vehicle on-scene (not illustrated) unrelated to the vehicle 102 but located nearby or associated with the incident at the vehicular destination location, may be identified in a same or similar manner as well.

In other embodiments, instead of identifying single target electronic devices, the vehicular computing device 108 of FIG. 1 acting as the electronic computing device may identify a group of a plurality of target electronic devices in a talkgroup by accessing an assignment database, locally at the vehicular computing device 108 or remotely at the dispatch console 158, assigning a particular talkgroup of radio devices associated with a first responder such as second officer 106 assigned to the vehicle 102, assigning the particular talkgroup directly to the vehicle 102, or assigning the particular talkgroup to an incident occurring at the vehicle location destination. For example, a CAD or dispatch record stored at dispatch console 158 or provided to vehicular computing device 108 upon dispatch or some other event, may identify a talkgroup that may include radio 107 associated with second officer 106, among other radios, and may use a talkgroup identifier of the identified talkgroup included in the record to target electronic devices to notify.

The identified talkgroup may include one or more target electronic devices associated with other occupants of the vehicle or one or more target electronic devices associated with other first responders dispatched to an incident at the vehicle destination location, among other possibilities.

In still other embodiments, and as one example for identifying an audio and/or visual output target electronic device fixed to an exterior or interior of the vehicle, the vehicular computing device 108 of FIG. 1 acting as the electronic computing device may be configured to cause a pre-configured tone or alert associated with a geofence breach, or pre-configured spoken warning identifying a geofence breach, to be played back at internal speaker 109 or at external speaker 126. In some embodiments, the vehicular computing device 108 may cause all communicably coupled interior and exterior speakers to playback the tone, alert, or warning, while in other embodiments, the vehicular computing device 108 may selectively enable such speakers.

More specifically, the vehicular computing device 108 may use information regarding whether any vehicular occupants, such as first and second officers 104 and 106, are still located within the vehicle 102 using any of the methods already set forth earlier (including but not limited to the seat sensor or door sensor, or head and/or eye-tracking device 110 that may be used as a presence detector) to subsequently enable only internal speaker 109, and alternatively use information regarding whether any vehicular occupants, such as first and second officers 104 and 106, are located outside of the vehicle using any of the methods already set forth earlier to subsequently enable only external speaker 126, while in other embodiments both internal and external speakers may be enabled if vehicular occupants are detected both inside and outside of the vehicle.

In still other embodiments, and where internal speaker 109 includes a distributed array of speakers through the internal cabin of the vehicle, the vehicular computing device 108 may identify, using information from integrated vehicular appliance 120 regarding the location of the detected breach, only the internal speaker closest to a location of the detected breach. The same technique could be applied where external speaker 126 includes a distributed array of speakers or where the external speaker is pivotable to direct the external speaker in a direction of the breach or a determined direction of the outside-of-vehicle (prior) vehicular occupants.

As a further example for identifying an audio and/or visual output target electronic device fixed to an exterior or interior of the vehicle, the vehicular computing device 108 of FIG. 1 acting as the electronic computing device may be configured to cause an internal or external light emitting device such as external lights 122 to turn on for a period of time, including any default or configured flashing, rotation, light color, or other configuration that may or may not be preconfigured as associated with a detected breach of a sized vehicular geofence. In some embodiments, the vehicular computing device 108 may cause all communicably coupled interior and exterior lights to turn on otherwise begin a visual playback to illustrate the breach, while in other embodiments, the vehicular computing device 108 may selectively enable such internal and/or external lights.

More specifically, the vehicular computing device 108 may use information regarding whether any vehicular occupants, such as first and second officers 104 and 106, are located within the vehicle 102 using any of the methods already set forth earlier to subsequently enable only internal lights (not shown in FIG. 1) such as cabin lights, hazard indicators, or displays associated with vehicular computing device 108, and alternatively use information regarding whether any vehicular occupants, such as first and second officers 104 and 106, are now located outside of the vehicle using any of the methods already set forth earlier to subsequently enable only external lights such as lights 122, 124, while in other embodiments both internal and external lights may be enabled if vehicular occupants are detected both inside and outside of the vehicle.

In still other embodiments, and where external lights 122, 124 may be replaced by a matrixed light bar, the vehicular computing device 108 may identify, using information from integrated vehicular appliance 120 regarding the location of the detected breach, only the portion of the matrixed light bar closest to a location of the detected breach and/or closest to a location of an exited vehicular occupant. The same technique could be applied where internal lights includes a distributed array of lights (such as left and right turn indicators that could be separately identified based on the identified location of the breach).

After detecting the breach and identifying one or more target electronic devices to notify of the detected breach, the electronic computing device may cause a notice of the breach to be provided to the identified one or more target electronic devices at the respective block 304, 310. In some examples, and especially where the target electronic device(s) is a visual or audio output device, the notice of breach may include a simple request to activate, such as a notice to external lights 122, 124 to activate or to external speaker 126 to activate. Included in the request may be a particular light pattern (flash pattern, sub-selection of matrixed lights to activate, time to activate, etc.) or a particular audio pattern (e.g., pitch, volume, stored digital file to playback, time to activate, etc.), which may then be correspondingly played back. Alternatively, the request may identify itself as a vehicular geofence breach, and a mapping stored locally at the external lights 122, 124 or external speaker 126 may choose the correct visual or audio pattern to playback to signal a vehicular geofence breach.

In still other examples, and especially where the target electronic device is or contains an electronic display (e.g., that of vehicular computing device 108 or radios 105, 107) the notice may include an instruction to playback an audio and/or visual alert, and may also include location information indicative of the location of the detected sized vehicular geofence breach and, in some embodiments and where available, an image captured of the object breaching the geofence or a generated image of an area surrounding the vehicle and/or exited vehicular occupant with an inserted symbol indicative of a location of the breach, among other possibilities, which may then be displayed to a user or occupant in response to receipt of the notice.

In still further embodiments, the notice may be provided to a remote computing device such as dispatch console 158 via RAN 152, after which a dispatcher at dispatch console 158 may use other communications methods to address the breach, including notification via a talkgroup of which the dispatcher and vehicle occupants (exited or not) may be members. The remote computing device may additionally or alternatively include a cloud compute cluster 160 or other remote computing device at which an object or face recognition algorithm may operate on an image capture of the object breaching the sized vehicular geofence and provided in the notice. Once an object or face recognition algorithm operating at the remote computing device obtains a positive match against a known object or known face, information identifying the object (object match) or identifying the person (facial match) may be provided back to the electronic computing device for further display (e.g., at the vehicular computing device 108) or transmission to other devices such as radios 105, 107.

The notice of the breach may instruct the receiving target electronic device to continue to provide an alert or notice of breach for a preconfigured or indicated period of time, or may cause the receiving target electronic device to continue to provide the alert or notice of breach until the electronic computing device determines that the breaching object has moved back outside of the sized vehicular geofence, at which time a second notice may be caused to be provided to the same identified one or more target electronic device to stop providing the alert or notice of breach. In still other examples, the alert or notice of breach may be continued to be provided until the electronic computing device, such as the vehicular computing device 108, receives notice or indication that a vehicle occupant (whether exited or not) has acknowledged the breach, such a via a detected voice response, hand gesture, or manual device input entry detected at and/or communicated to the electronic computing device.

In the event that an imaging barrier (such as a tree, wall, or other barrier through which light or radio waves cannot pass) is detected within the bounds of the second sized vehicular geofence that was not detected within the bounds of the first sized vehicular geofence, the electronic computing device may identify one or more target electronic devices to notify of the detected barrier including at least one of (i) a target electronic device associated with the exited vehicular occupant, (ii) a target electronic device associated with a second vehicular occupant still in the vehicle, and (iii) an audio and/or visual output target electronic device fixed to an exterior or interior of the vehicle; and cause a notice of barrier message to be provided, via the transceiver, to the identified one or more target electronic devices.

Figure 6:
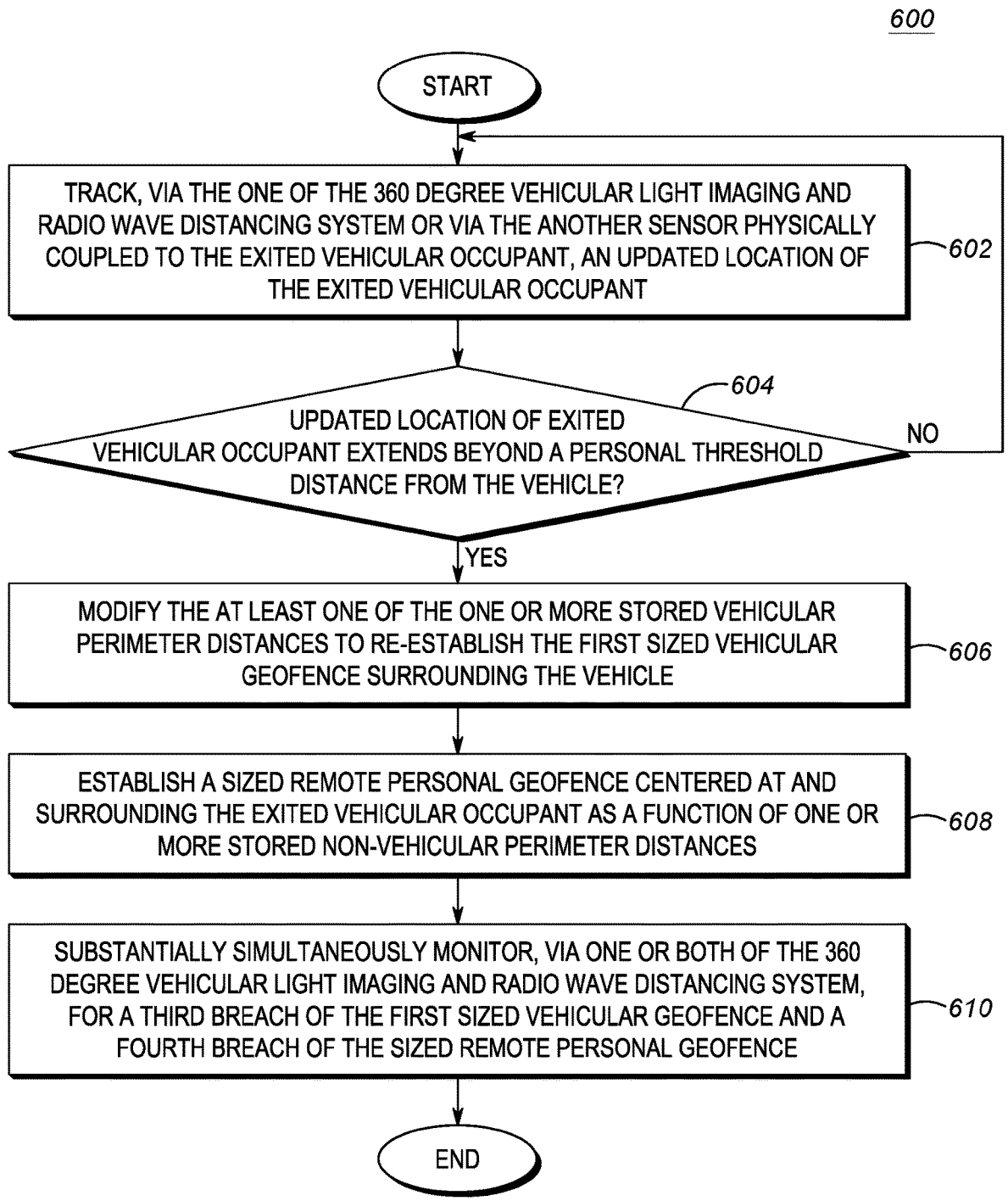
FIG. 6 illustrates a further flow chart setting forth process blocks for dynamic vehicular threat detection perimeter modification for an exited vehicular occupant, in accordance with an embodiment.
Figure 7:
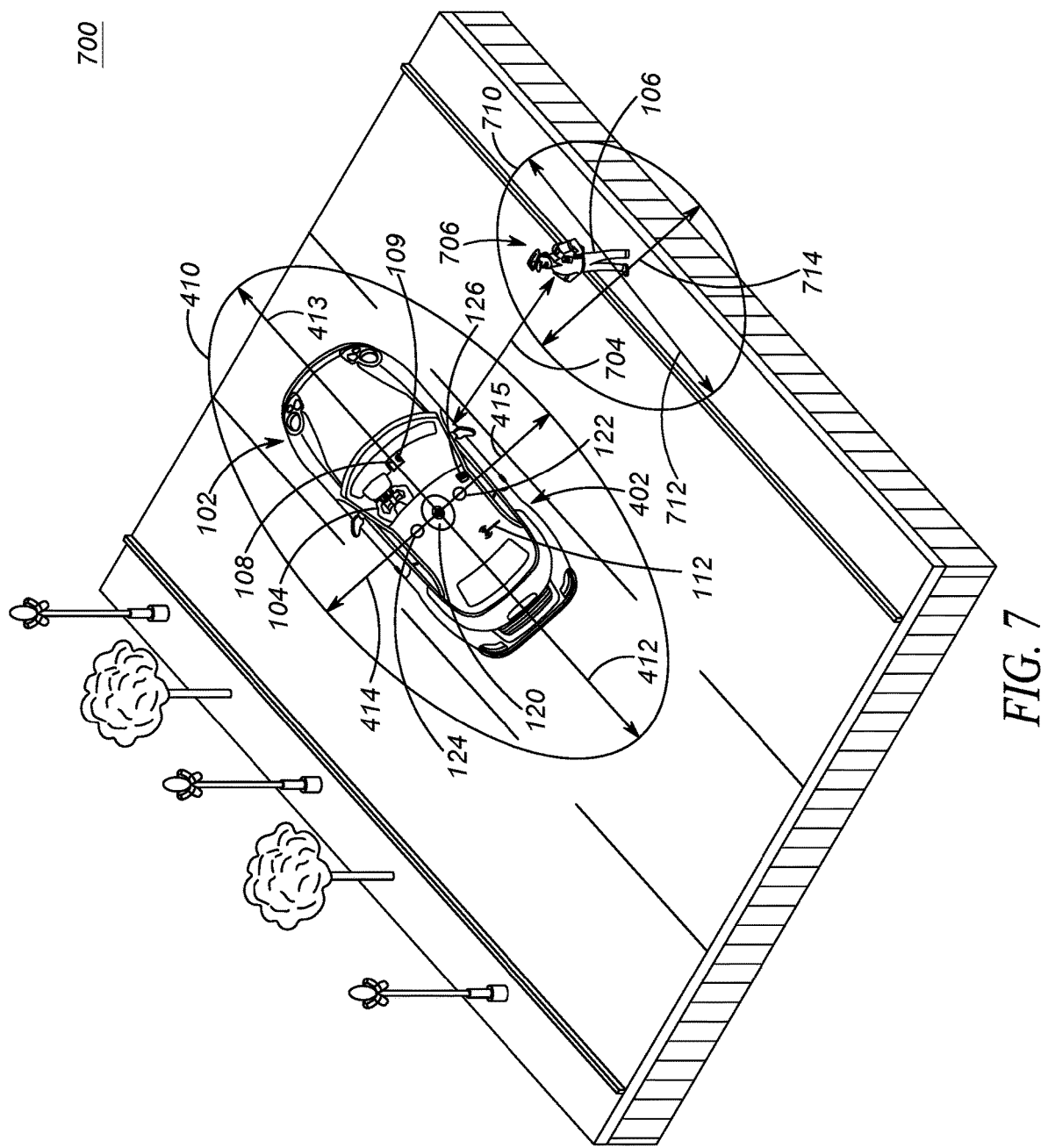
FIG. 7 is a perspective view illustrating a second example of dynamic vehicular threat detection perimeter modification for an exited vehicular occupant, in accordance with an embodiment.

Turning now to FIGS. 6 and 7, a further embodiment is described for those instances in which the location of the exited vehicular occupant is capable of continuing to be tracked (such as via the 360 degree vehicular light imaging or RADAR distancing system or RFID circuit and reader, among others). In those instances where the exited vehicular occupant moves far enough away from the vehicle, attempting to modify the first sized vehicular geofence to a modified second sized vehicular geofence that encompasses both the vehicle and the exited vehicular occupant may include so much intervening space between the vehicle and the exited vehicular occupant that the same problem arise as noted elsewhere in this disclosure, i.e., that a number of false positive notifications may be generated so as to cause the remaining vehicular occupant(s) and/or exited vehicular occupant(s) to ignore the notifications of breach. Accordingly, process 600 sets forth an alternative and/or additional process by which a separate personal geofence may be created, still monitored and enforced by at least one of the 360 degree vehicular light imaging and RADAR distancing systems, around the exited vehicular occupant when he or she moves more than a threshold distance away from the vehicle. As a result, the vehicle and exited vehicular occupant can continue to be protected in the manner set forth herein, while preventing substantial intervening portions of space between the vehicle and the exited vehicular occupant from triggering unwanted or unneeded breach notifications. Other advantages are possible as well. The process 600 may flow in parallel with block 310 of process 300, may execute after block 310 of process 300, or may operate independently of or in parallel to blocks 308 and 310 and may be executed after block 306 of process 300, among other possibilities.

Process 600 begins at block 602, where the electronic computing device, same or similar to that set forth earlier, tracks, via one of the 360 degree vehicular light imaging and RADAR distancing system or via the another sensor physically coupled to the exited vehicular occupant, an updated location of the exited vehicular occupant. Tracking of the exited vehicular occupant's location outside of the vehicle may be performed in any one or more of the ways already set forth earlier.

At block 604, the electronic computing device determines if the updated location of the exited vehicular occupant extends beyond a stored personal threshold distance from the vehicle. The personal threshold distance may be configurable and may be set in the range of, for example, 1 to 25, 5 to 20, or 10 meters, as some examples.

The updated location may be provided to the electronic computing device and/or stored at the electronic computing device in a number of ways, such that a direct comparison between the updated location and the personal threshold distance is possible (e.g., where the updated location is stored to include a calculated distance, and perhaps direction vector, from the vehicle 102 and/or integrated vehicular appliance 120, or the electronic computing device may convert the updated location to a distance measurement (e.g., where the updated location is stored as a GPS location, time of flight distance using light or radio waves, or some other value indicative of distance but not directly comparable to the stored personal threshold distance)) prior to comparing it to the personal threshold distance. In still other embodiments, the personal threshold distance may be stored in terms of time of flight distance, or some other value more easily and immediately comparable to the stored updated location of the exited vehicular occupant (when stored as time of flight distance), among other possibilities.

FIG. 7 sets forth an example perspective view 700 consistent with this example. As shown in FIG. 7, the second officer 106 vehicular occupant has exited the vehicle 102 and moved from the exit location 506 of FIG. 5 to an updated location 706 in FIG. 7 that is a particular distance 704 away from the vehicle. The particular distance 704 may be, for example, 11 meters and the personal threshold distance may be, for example, 10 meters.

In some embodiments, the personal threshold distance may be varied based on how many or how close civilian or vehicular throughways are determined or detected to be within a second threshold distance of the vehicle, the second threshold distance ranging from 0-15 or 5-10 or 8 meters of the vehicle. For example, the electronic computing device may access, locally or remotely, cartographic information and determine if any well-traveled pedestrian walkways or vehicular roadways travel between the vehicle and the updated location, and if they do, may apply a lower personal threshold of 5-10 meters compared to if no well-traveled pedestrian walkways or vehicular roadways are located between the vehicle and the update location, in which a larger personal threshold of 10-15 meters may be used. Other combinations are possible as well.

Returning to FIG. 6, if the determination at block 604 is that the updated location of the exited vehicular occupant does not extend beyond the personal threshold distance from the vehicle, processing returns to block 602. If, on the other hand, the determination at block 604 is that the updated location of the exited vehicular occupant does extend beyond the personal threshold distance from the vehicle, processing continues to block 606.

At block 606, the electronic computing device modifies the at least one of the one or more stored vehicular perimeter distances to re-establish the first sized vehicular geofence surrounding the vehicle established at block 302 of process 300. Block 606 may, in some embodiments, be optional and/or omitted. For example, where the first sized vehicular geofence was never modified such as at block 308, no re-establishment would be possible at block 606 and the block eliminated or skipped. In other embodiments, the second sized vehicular geofence perhaps established prior to block 606 may be maintained as is, and subsequent blocks of process 600 create the sized remote personal geofence as a secondary geofence to the second sized vehicular geofence. Other possible combinations exist as well.

At block 608, the electronic computing device establishes a sized remote personal geofence centered at and surrounding the exited vehicular occupant as a function of one or more stored non-vehicular perimeter distances.

For example, and as set forth in FIG. 7, a sized remote personal geofence 710 may be established centered at the updated location 706 as a function of a first stored non-vehicular perimeter distance 712 and a second stored non-vehicular perimeter distance 714. The first and second stored non-vehicular perimeter distances 712, 714 may be smaller or equal to the stored vehicular perimeter distances 412-415, and may be, for example, on the order of 2-10 or 4-7 meters, as examples. Similar to the various possible shapes and sizes set forth above with respect to the first and second sized vehicular geofences 410, 510, the one or more stored non-vehicular perimeter distances may be varied so as to form any number of geometric and non-geometric shapes, including a circle, an oval, two joined half circles, two joined half ovals, or other shapes perhaps determined by the manner in which the remote personal geofence 710 is monitored, such as a partial cone shape when the 360 degree RADAR distancing system is used to establish and monitor the remote personal geofence 710.

At block 610, the electronic computing device substantially simultaneously monitors, via one or both of the 360 degree vehicular light imaging and RADAR distancing systems, for a third breach of the first sized vehicular geofence and a fourth breach of the sized remote personnel geofence. (While numbered references to "breaches" are set forth throughout this description and in processes 300 and/or 600, it should be noted that such numbered breaches are merely used for differentiating the monitoring functions and differentiating how different breaches are monitored for under different conditions, and are not intended to require any actual, for example, first, second, and third breaches to detect a fourth breach, but rather, a fourth breach may in reality be the first breach actually detected, and other combinations are possible as well). As noted earlier, in various embodiments, the monitoring for the third breach of the first sized vehicular geofence at block 610 may be replaced with monitoring for the second breach of the second sized vehicular geofence where block 606 is not executed, and monitoring for the third breach of the first sized vehicular geofence at block 610 may be the same as monitoring for the first breach at block 304, where process 600 is executed after block 306 of process 300. Other possibilities exist as well.

The substantial simultaneous monitoring at block 610 may mean that each one of the 360 degree vehicular light imaging and the RADAR distancing systems is used to separately monitor for one of the third breach of the first sized vehicular geofence and the fourth breach of the sized remote personnel geofence, or may mean that a single one of the 360 degree vehicular light imaging and the RADAR distancing systems is used to monitor for both the third breach of the first sized vehicular geofence and the fourth breach of the sized remote personnel geofence, perhaps in a time-shared manner (e.g., 500 ms scanning for or processing point clouds or visible light imaging captures for the third breach of the first sized vehicular geofence followed by 500 ms scanning for or processing point clouds or visible light imaging captures for the fourth breach of the sized remote personnel geofence, repeated in an interwoven fashion, among other various time-shared possibilities).

At block 610, the electronic computing device may continue to track the updated location(s) of the exited vehicular occupant, and in those situations where the updated location extends beyond a second personal threshold distance (such as 20-40 m, or 25 m) larger than the personal threshold distance above that may be consistent with a maximum range of the one of the 360 degree vehicular light imaging and radio wave distancing system, the sized remote personal geofence may be eliminated and a notice of the elimination provided to the identified one or more target electronic devices in a same or similar manner to that set forth earlier.

3. CONCLUSION

In accordance with the foregoing, an improved device, method, and system is disclosed for dynamic perimeter threat detection for a movable vehicle.

Each of the above blocks in FIGS. 3 and/or 6 are integrated to improve the functioning of the electronic computing device, such as electronic computing device 200 or vehicular computing device 108, in that the above blocks allow a sized vehicular geofence surrounding a vehicle to be modified responsive to a detected vehicular occupant exiting the vehicle, and as a function of a detected location of the exited vehicular occupant, such that both remaining vehicular occupants (if any) and the exited vehicular occupant can be electronically monitored and electronically notified of approaching objects and danger to exited and non-exited vehicular occupants, whose attention may be focused elsewhere, such as on investigating an incident or crime, while avoiding generating false electronic notifications due to an unduly large monitored vehicular geofence expanded in all directions around the vehicle.

Accordingly, both exited and non-exited vehicular occupants receive fewer false positives due to automatic adjustments to electronically monitored vehicular geofence sizes and shapes, while still allowing early electronic notifications of geofence breaches to exited and non-exited vehicular occupants. Furthermore, processing power and transmission bandwidth may be saved by selectively increasing and reducing geofence sub-portion sizes where appropriate, resulting in reduced power consumption and bandwidth consumption. And no manual user interaction is required to make such automatic adjustments, which increases user acceptance of the safety increasing electronic vehicular perimeter threat detection feature.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order or number of occurrences between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An electronic processing system for dynamic vehicular threat detection perimeter modification for an exited vehicular occupant, the system comprising:
   a memory;
   a transceiver;
   one of a vehicular light imaging and a radio wave distancing system physically coupled to a vehicle; and
   one or more processors configured to:
      detect, via the one of the vehicular light imaging and radio wave distancing system or via another sensor physically coupled to an interior or exterior of the vehicle or to a vehicular occupant, that the vehicular occupant previously inside the vehicle has exited the vehicle;
      responsive to detecting that the vehicular occupant previously inside the vehicle has exited the vehicle, modify at least one of one or more stored vehicular perimeter distances to establish a sized vehicular geofence surrounding the vehicle as a function of the modified one or more stored vehicular perimeter distances; and
      monitor, via the one of the vehicular light imaging and radio wave distancing system while the vehicular occupant remains exited from the vehicle, for a breach of the sized vehicular geofence.

2. The electronic processing system of claim 1, wherein the one or more processor are further configured to:
   detect, via the one of the vehicular light imaging and radio wave distancing system, the breach of the sized vehicular geofence;
   identify one or more target electronic devices to notify of the detected breach including at least one of (i) a target electronic device associated with the exited vehicular occupant, (ii) a target electronic device associated with a second vehicular occupant still in the vehicle, and (iii) an audio and/or visual output target electronic device fixed to an exterior or interior of the vehicle; and responsive to detecting the breach, cause a notice of breach message to be provided, via the transceiver, to the identified one or more target electronic devices.

3. The electronic processing system of claim 2, wherein the one or more processors are further configured to identify the one or more target electronic devices to notify of the breach including at least one of (i) the target electronic device associated with the exited vehicular occupant, (ii) the target electronic device associated with the second vehicular occupant still in the vehicle, and (iii) the audio and/or visual output target electronic device fixed to the exterior or interior of the vehicle by identifying the target electronic device associated with the exited vehicular occupant.

4. The electronic processing system of claim 2, wherein the one or more processors are further configured to identify the one or more target electronic devices to notify of the breach including at least one of (i) the target electronic device associated with the exited vehicular occupant, (ii) the target electronic device associated with the second vehicular occupant still in the vehicle, and (iii) the audio and/or visual output target electronic device fixed to the exterior or interior of the vehicle by identifying the audio and/or visual output target electronic device fixed to the exterior or interior of the vehicle.

5. The electronic processing system of claim 4, wherein the audio and/or visual output target electronic device is one of a vehicle siren and a vehicle light bar, and wherein the notice of breach message is an instruction to one of activate the vehicle siren and activate at least a portion of the vehicle light bar.

6. The electronic processing system of claim 2, wherein the one or more processors are further configured to detect, via the one of the vehicular light imaging and radio wave distancing system physically coupled to the vehicle and communicably coupled to the vehicular computing device, the breach of the sized vehicular geofence by detecting, via the vehicular light imaging distancing system physically coupled to the vehicle and communicably coupled to the vehicular computing device, the breach of the sized vehicular geofence; and wherein the vehicular light imaging distancing system includes a visible light imaging device that is further configured to, responsive to detecting the breach of the sized vehicular geofence, capture an image of a person or object detected as breaching the sized vehicular geofence and provide, via the one or more processors and accompanying the notice of breach message or subsequent to the notice of breach message, the captured image to the identified one or more target electronic devices.

7. The electronic processing system of claim 1, wherein the radio wave distancing system is a radio direction and distance (RADAR) distancing system.

8. The electronic processing system of claim 1, wherein the one or more stored vehicular perimeter distances used to establish the sized vehicular geofence are further varied as a function of one or more retrieved vehicular perimeter contextual parameters including one or more of an incident type associated with a vehicle destination location, a historical crime rate associated with the vehicle destination location, and a real-time crime rate associated with the vehicle destination location.

9. The electronic processing system of claim 1, wherein the one or more processors are further configured to:
detect, via the one of the vehicular light imaging and radio wave distancing system or via another sensor physically coupled to the interior or exterior of the vehicle, that the exited vehicular occupant previously outside the vehicle has returned to inside the vehicle;
modify the at least one of the one or more stored vehicular perimeter distances to establish a second sized vehicular geofence surrounding the vehicle smaller than the sized vehicular geofence; and
monitor, via the one of the vehicular light imaging and radio wave distancing system, for a second breach of the second sized vehicular geofence.

10. The electronic processing system of claim 1, wherein the sized vehicular geofence is defined by first, second, third, and fourth stored vehicular perimeter distances establishing a geometric geofence surrounding the vehicle, and wherein the one or more processors are further configured to:
determine an updated location or direction vector associated with the exited vehicular occupant; and
responsive to detecting that the vehicular occupant previously inside the vehicle has exited the vehicle, modify only one or two of the first, second, third, and fourth stored vehicular perimeter distances to increase a value of the only one or two of the first, second, third, and fourth stored vehicular perimeter distances so as to expand a size of the geometric geofence surrounding the vehicle in a direction of the determined updated location or direction vector associated with the exited vehicular occupant to create the sized vehicular geofence having a geometric or non-geometric shape.

11. The electronic processing system of claim 10,
wherein the one of the vehicular light imaging and radio wave distancing system is formed of four distinct substantially 90 degree vehicular light imaging and radio wave distancing imagers, a first of the four distinct distancing imagers directed to image past a front of the vehicle, a second of the four distinct distancing imagers directed to image past a rear of the vehicle, a third of the four distinct distancing imagers directed to image past a first respective side of the vehicle, and the fourth of the four distinct distancing imagers directed to image past a second respective side of the vehicle opposite the first respective side; and
wherein the first stored vehicular perimeter distance is associated with the first of the four distinct distancing imagers, the second stored vehicular perimeter distance is associated with the second of the four distinct distancing imagers, the third stored vehicular perimeter distance is associated with the third of the four distinct distancing imagers, and the fourth stored vehicular perimeter distance is associated with the fourth of the four distinct distancing imagers.

12. The electronic processing system of claim 1, wherein the one or more processors further configured to:
track, via the one of the vehicular light imaging and radio wave distancing system, an updated location of the exited vehicular occupant;
determine that the updated location extends beyond a personal threshold distance from the vehicle, and responsively:
modify the at least one of the one or more stored vehicular perimeter distances to establish a second sized vehicular geofence surrounding the vehicle smaller than the sized vehicular geofence;
establish a sized remote personal geofence centered at and surrounding the exited vehicular occupant as a function of one or more stored non-vehicular perimeter distances; and
substantially simultaneously monitor, via one or both of the vehicular light imaging and radio wave distancing system, for a second breach of the sized vehicular geofence and a third breach of the sized remote personal geofence.

13. The electronic processing system of claim 12, wherein the personal threshold distance from the vehicle is between 5 and 10 meters.

14. The electronic processing system of claim 12, the one or more processors further configured to substantially simultaneously monitor, via one of the vehicular light imaging and radio wave distancing system, for the second breach of the sized vehicular geofence and, via the other of the vehicular light imaging and radio wave distancing system, for the third breach of the sized remote personal geofence.

15. The electronic processing system of claim 12, the one or more processors further configured to substantially simultaneously monitor, via a first one of the vehicular light imaging and radio wave distancing system, for both the second breach of the sized vehicular geofence and for the third breach of the sized remote personal geofence.

16. The electronic processing system of claim 12, wherein the personal threshold distance is varied based on how many or how close civilian or vehicular throughways are determined or detected to be within a second threshold distance of the vehicle.

17. The electronic processing system of claim 1, wherein the one or more processors further configured to:
   detect, via the one of the vehicular light imaging and radio wave distancing system, an imaging barrier within a bounds of the sized vehicular geofence, and
   identify one or more target electronic devices to notify of the detected imaging barrier including at least one of (i) a target electronic device associated with the exited vehicular occupant, (ii) a target electronic device associated with a second vehicular occupant still in the vehicle, and (iii) an audio and/or visual output target electronic device fixed to an exterior or interior of the vehicle; and
   responsive to establishing the sized vehicular geofence and detecting the barrier, cause a notice of barrier message to be provided, via the transceiver, to the identified one or more target electronic devices.

18. The electronic processing system of claim 1, wherein detecting that the vehicular occupant previously inside the vehicle has exited the vehicle comprises detecting, via the another sensor physically coupled to the interior or exterior of the vehicle, that the vehicular occupant previously inside the vehicle has exited the vehicle, wherein the another sensor is a door latch or door handle sensor configured to detect that a vehicular door has been opened.

19. The electronic processing system of claim 1, wherein detecting that the vehicular occupant previously inside the vehicle has exited the vehicle comprises detecting, via the another sensor physically coupled to the vehicular occupant, that the vehicular occupant previously inside the vehicle has exited the vehicle, wherein the another sensor is an RFID circuit physically coupled directly or indirectly to the vehicular occupant.

20. A method for dynamic vehicular threat detection perimeter modification for an exited vehicular occupant, the method comprising:
   detecting, by an electronic computing device via one of a vehicular light imaging and a radio wave distancing system or via another sensor physically coupled to an interior or exterior of the vehicle or to a vehicular occupant, that the vehicular occupant previously inside the vehicle has exited the vehicle;
   responsive to detecting that the vehicular occupant previously inside the vehicle has exited the vehicle, modifying, by the electronic computing device, at least one of one or more stored vehicular perimeter distances to establish a sized vehicular geofence surrounding the vehicle as a function of the modified one or more stored vehicular perimeter distances; and
   monitoring, by the electronic computing device via the one of the vehicular light imaging and radio wave distancing system, for a breach of the sized vehicular geofence.

* * * * *